United States Patent
Kaku et al.

(10) Patent No.: US 11,726,812 B2
(45) Date of Patent: *Aug. 15, 2023

(54) DYNAMIC RECONFIGURATION OF APPLICATIONS ON A MULTI-PROCESSOR EMBEDDED SYSTEM

(71) Applicant: Coherent Logix, Incorporated, Austin, TX (US)

(72) Inventors: Wilbur William Kaku, Sunnyvale, CA (US); Michael Lyle Purnell, Scotts Valley, CA (US); Geoffrey Neil Ellis, Santa Cruz, CA (US); John Mark Beardslee, Menlo Park, CA (US); Zhong Qing Shang, Cupertino, CA (US); Teng-I Wang, Yorba Linda, CA (US); Stephen E. Lim, Scotts Valley, CA (US)

(73) Assignee: Coherent Logix, Incorporated, Austin, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/243,890

(22) Filed: Apr. 29, 2021

(65) Prior Publication Data

US 2021/0294643 A1    Sep. 23, 2021

Related U.S. Application Data

(63) Continuation of application No. 15/976,021, filed on May 10, 2018, now Pat. No. 11,023,272, which is a
(Continued)

(51) Int. Cl.
*G06F 9/48* (2006.01)
*G06F 12/00* (2006.01)
(Continued)

(52) U.S. Cl.
CPC ............ *G06F 9/4843* (2013.01); *G06F 8/656* (2018.02); *G06F 9/445* (2013.01); *G06F 9/461* (2013.01); *G06F 9/4856* (2013.01); *G06F 12/00* (2013.01)

(58) Field of Classification Search
CPC .... G06F 2209/482; G06F 9/485; G06F 12/00; G06F 9/4856; G06F 9/5066; G06F 8/656; G06F 9/461; G06F 9/4843; G06F 9/445
(Continued)

(56) References Cited

U.S. PATENT DOCUMENTS

| 5,649,112 | A | 7/1997 | Yeager et al. |
| 7,360,221 | B2 | 4/2008 | Alverson |

(Continued)

FOREIGN PATENT DOCUMENTS

| CN | 1549964 A | 11/2004 |
| CN | 1910554 | 2/2007 |

(Continued)

OTHER PUBLICATIONS

Atsushi Sawada, "Built-in Software Development Technology"; vol. 3, No. 1; CQ Publishing Company; Japan; May 24, 20211; pp. 228-235.
(Continued)

*Primary Examiner* — David Yi
*Assistant Examiner* — Zubair Ahmed
(74) *Attorney, Agent, or Firm* — Kowert, Hood, Munyon, Rankin & Goetzel, P.C.

(57) ABSTRACT

A multiprocessor system and method for swapping applications executing on the multiprocessor system are disclosed. The plurality of applications may include a first application and a plurality of other applications. The first application may be dynamically swapped with a second application. The swapping may be performed without stopping the plurality
(Continued)

of other applications. The plurality of other applications may continue to execute during the swapping to perform a real-time operation and process real-time data. After the swapping, the plurality of other applications may continue to execute with the second application, and at least a subset of the plurality of other applications may communicate with the second application to perform the real time operation and process the real time data.

20 Claims, 21 Drawing Sheets

Related U.S. Application Data continuation of application No. 14/921,281, filed on Oct. 23, 2015, now Pat. No. 9,990,227, which is a continuation of application No. 13/896,577, filed on May 17, 2013, now Pat. No. 9,195,575.

(51) Int. Cl.
  *G06F 9/46* (2006.01)
  *G06F 9/445* (2018.01)
  *G06F 8/656* (2018.01)
(58) Field of Classification Search
  USPC .................................. 711/147, 100
  See application file for complete search history.

(56) References Cited

U.S. PATENT DOCUMENTS

| | | | |
|---|---|---|---|
| 7,853,934 B2 | 12/2010 | Partamian | |
| 8,140,829 B2 | 3/2012 | Eickemeyer | |
| 8,561,078 B2 | 10/2013 | Sandstrom | |
| 8,924,619 B2 | 12/2014 | Cohen et al. | |
| 2002/0178274 A1 | 11/2002 | Kovacevic | |
| 2005/0188372 A1* | 8/2005 | Inoue | G06F 9/4856 718/100 |
| 2007/0226686 A1 | 9/2007 | Beardslee et al. | |
| 2012/0137119 A1 | 5/2012 | Doerr et al. | |
| 2013/0081044 A1* | 3/2013 | Sandstrom | G06F 15/80 718/104 |
| 2013/0111158 A1* | 5/2013 | Suzuki | G06F 12/0811 711/156 |
| 2014/0281057 A1 | 9/2014 | Cohen et al. | |

FOREIGN PATENT DOCUMENTS

| | | |
|---|---|---|
| CN | 101479704 A | 7/2009 |
| CN | 101667138 | 3/2010 |
| EP | 1326165 A2 | 7/2003 |
| JP | H10-326195 A | 12/1998 |
| JP | 2001-189387 A | 7/2001 |
| JP | 2002-215712 A | 8/2002 |
| WO | 0072528 A1 | 11/2000 |
| WO | 2004003781 A2 | 1/2004 |
| WO | 2012051577 A1 | 4/2012 |

OTHER PUBLICATIONS

Japanese Office Action; Application No. 2020-126852; dated Aug. 31, 2021; 10 pgs.
Wahlah, Muhammad Aqeel and Kees Goossens, "Composable and Persistent-State Application Swapping on FPGAs Using Hardwired Network on Chip," IEEE 2009 International Conference on Reconfigurable Computing and FPGAs; Dec. 9-11, 2009; pp. 380-385, Cancun, Quintano Roo, Mexico (6 pages).
Office Action, Chinese Application for Invention No. 201380077900.X, dated Jun. 19, 2018, 26 pages.
European Search Report, Application No. 19158284.0, dated Oct. 29, 2019, 12 pages.
Notice of Reason for Refusal, Application No. JP 2018-233478, dated Nov. 19, 2019, 7 pages.
Fujikura, Toshiyuki "Introduction to Embedded Programming Knowhow, Part 1: What is a multi-task system?", Interface, Japan, CQ Publishing Co.,Ltd., Mar. 1, 2002, vol. 28, No. 3, pp. 132-140.
International Search Report and Written Opinion for PCT/US2013/041942, dated Jan. 30, 2014, 10 pgs.
Written Opinion for PCT/US2013/041942, dated Jan. 6, 2015, 5 pgs.
Office Action dated Mar. 28, 2017 in JP Appln No. JP2016-513913, 10 pgs.
Extended European Search Report for EP Appln. No. 17185840.0 dated Dec. 12, 2017, 11 pgs.
Office Action in JP Appln. No. 2017-198250 dated Aug. 28, 2018, 3 pgs.
Office Action in JP Appln. No. 2018-233478 dated Nov. 19, 2019, 7 pgs.
Toshiyuki Fukuura, "Introduction to Embedded Programming Knowhow, Part 1: What is a multi-task system?", Interface, Japan, CQ Publishing Co., Ltd., Mar. 1, 2002, vol. 28, No. 3, pp. 132-140.

\* cited by examiner

DYNAMIC RECONFIGURATION OF APPLICATIONS ON A MULTI-PROCESSOR EMBEDDED SYSTEM

PRIORITY INFORMATION

This application is a continuation of U.S. patent application Ser. No. 15/976,021 entitled "Dynamic Reconfiguration of Applications on a Multi-Processor Embedded System," filed May 10, 2018, which is a continuation of Ser. No. 14/921,281 entitled "Dynamic Reconfiguration of Applications on a Multi-Processor Embedded System," filed Oct. 23, 2015, now U.S. Pat. No. 9,990,227, which is a continuation of U.S. patent application Ser. No. 13/896,577 entitled "Dynamic Reconfiguration of Applications on a Multi-Processor Embedded System," filed May 17, 2013, now U.S. Pat. No. 9,195,575. All of the aforementioned Applications are incorporated by reference in their entireties.

The claims in the instant application are different than those of the parent application or other related applications. The Applicant therefore rescinds any disclaimer of claim scope made in the parent application or any predecessor application in relation to the instant application. The Examiner is, therefore, advised that any such previous disclaimer and the cited references that it was made to avoid, may need to be revisited. Further, any disclaimer made in the instant application should not be read into or against the parent application or other related applications.

BACKGROUND

Technical Field

This invention relates to multi-processor systems, and more particularly to dynamic reconfiguration of software applications executing on a multi-processor system (MPS).

Description of the Related Art

An embedded system may be described as a computer system designed for specific functions, often with real-time computing constraints. Physically, embedded systems range from portable consumer electronic devices, such as video and/or audio devices, to large stationary installations such as traffic lights, factory controllers, and largely complex systems such as hybrid vehicles and avionics. Embedded systems may receive input signals and process the signals in real time to perform a specific real-time operation. Embedded systems may instead (or in addition) perform real time processing and generate an output signal.

The processing performed by an embedded system may be implemented in different ways. Some devices use field programmable gate arrays (FPGAs) or other programmable logic devices. FPGAs are a means of implementing complex systems without using a stored imperative software programming approach. Instead, these devices are configured using a hardware description language, such as VHDL or Verilog, which enables the user to describe an interconnected set of electrical components. The FPGA realizes this interconnected design by programming fuses or setting configuration memory locations when the chip is being initialized.

An embedded system may also be implemented with one or more processors or digital signal processing (DSP) engines. For example, traditional coarse-grained programmable embedded systems may have a small number of processors or DSP engines, such as two or four processor cores as well as fixed or programmable application-specific logical functions. These systems usually have large data and instruction memories or utilize virtual memory schemes to extend the range of data and instruction memories that can be addressed.

In some cases it may be desirable to re-program an embedded system at run-time, e.g., where the re-programming occurs without stopping the system. However, both FPGA-based and traditional processor-based embedded systems have drawbacks that make such re-programming problematic. For example, although some FPGA devices may have limited capabilities for reconfiguring a specific physical region of the FPGA during run-time, it is generally difficult to dynamically re-program an FPGA to perform a different application at run-time. For example, the FPGA re-configurability may not be on a logical (or application) basis, but on the basis of what part of the logical design is mapped to a particular physical part of the chip. Much effort could be expended to align the logical and physical mapping of a design on an FPGA, but it would likely cause the implementation to be very inefficient.

In traditional processor-based systems, processing power may be shared among different applications through the well-known technique of multitasking. In this approach, two or more applications can run at the same time on the same processor in an interleaved fashion. The processor dynamically manages the state of multiple applications. However, this can incur a performance penalty and inject a non-deterministic time delay that may not be acceptable for a real-time embedded system.

It may thus be desirable to provide a real-time embedded system, which offers an improved ability to perform re-programming of the system at run-time, e.g., by dynamically swapping applications without stopping the system from executing.

SUMMARY

Various embodiments are disclosed of a multiprocessor system and an associated method for swapping applications executing on the multiprocessor system. The multiprocessor system may include a plurality of processors and a plurality of memories interspersed among the processors. A plurality of applications may be loaded on the multiprocessor system. Loading the applications may include distributing instructions and data from the plurality of applications among different respective ones of the plurality of memories for execution by associated processors. The plurality of applications may be executed on the multiprocessor system. In some embodiments the plurality of applications may execute together and communicate with each other to perform a real-time operation. For example, the plurality of applications may process the real time data. The real-time operation may perform at least one of input or output with real time data.

The plurality of applications may include a first application and a plurality of other applications. According to some embodiments, the first application may be swapped with a second application, wherein the second application may not be one of the plurality of applications that was previously loaded and executing on the multiprocessor system. The swapping may be performed without stopping the plurality of other applications. In other words, the plurality of other applications may continue to execute during the swapping to perform the real time operation and process the real time data. After the swapping, the plurality of other applications may continue to execute with the second application, and at least a subset of the plurality of other applications may communicate with the second application to perform the real time operation and process the real time data. The plurality of other applications may not be aware that the swapping is occurring.

Prior to the swapping, the first application may execute on a first subset of the plurality of processors. In some embodiments, the swapping may include stopping the first application on the first subset of the plurality of processors, decoupling the first application from one or more external resources that are external to the multiprocessor system, and optionally saving the state of the first application. The swapping may further include, prior to swapping in the second application, resetting the first subset of the plurality of processors to place the first subset of the plurality of processors in a known state. The swapping may further include decoupling communication of the first application with one or more of the other applications.

The swapping may then involve loading the second application into memories associated with the first subset of the plurality of processors. After loading the second application, the second application may be coupled to one or more external resources, which may be the same one or more external resources to which the first application was previously coupled, or may be different external resources. After the second application has been loaded, the swapping may further include coupling communication of the second application with one or more of the other applications, which may be the same applications with which the first application previously communicated, or may be different applications.

In some embodiments, one or more first buffer memories may be coupled between the first subset of the plurality of processors and other ones of the plurality of processors. Decoupling communication of the first application may include controlling the one or more first buffer memories to enable the decoupling, e.g., by altering communication performed by a first buffer memory to and/or from the first application.

In some embodiments the first application may be on a downstream side of the first buffer memory, and altering the communication performed by the first buffer memory may include discontinuing the first buffer memory from accepting data from a sending application during the swapping. In some embodiments the sending application may stall in response to the first buffer memory discontinuing accepting data from the sending application. In other embodiments the altering may include configuring the first buffer memory to continue accepting data from the sending application during the swapping and to overwrite previously stored and unsent data.

In other embodiments the first application may be on an upstream side of the first buffer memory, and altering the communication performed by the first buffer memory may include discontinuing the first buffer memory from forwarding data to a receiving application during the swapping. In some embodiments the first buffer memory may be discontinued from forwarding data to the receiving application once there is no more incoming data from the first application. In other embodiments the altering may include configuring the first buffer memory to repeatedly send its data to a receiving application two or more times during the swapping, e.g., data that was previously received from the first application and stored in the first buffer memory. Thus, the same data may be repeatedly sent to the receiving application during the swapping.

In some embodiments the first application may communicate structured data elements via a first buffer memory. Each data element may have a beginning boundary and an ending boundary. The first buffer memory may receive a request to discontinue data communication after transmission of a first data element has been initiated. In some embodiments the first buffer memory may continue transmission of the first data element up to the ending boundary of the first data element.

When the second application is swapped in, the second application may be coupled to the application(s) with which it communicates by configuring one or more of the buffer memories. For example, if the second application communicates with the same other application(s) as the first application then the second application may be coupled to these other application(s) by controlling the same one or more first buffer memories involved in decoupling the first application from the other application(s).

For example, the first application may have been on the downstream side from a given buffer memory, and the buffer memory may have been discontinued from accepting data from a sending application when the first application was swapped out. When the second application is swapped in, the buffer memory may be placed back in a mode of accepting data. Thus, when the execution of the second application is started, the data sent by the sending application may now be sent to the second application instead of the first application, which previously received data from the sending application.

As another example, the first application may have been on the upstream side from a given buffer memory, and the buffer memory may have been discontinued from forwarding data to a receiving application when the first application was swapped out. When the second application is swapped in, the buffer memory may be placed back in a mode of forwarding data. Thus, when the execution of the second application is started, the receiving application may now receive data from the second application instead of the first application that previously sent data to the receiving application.

The second application may execute on the same subset of processors of the multiprocessor system that were previously used to execute the first application, or may execute on a different subset of processors, or on a combination of same and different processors. The swapping may include loading program instructions and/or data of the second application into one or more memories associated with the subset of processors that execute the second application. In some embodiments the second application may be loaded into the one or more memories from an external memory device, such as a RAM device, flash memory device, or other memory device that is external to the multiprocessor system. In other embodiments the second application may be loaded into the one or more memories from an instruction stream transmitted by an external processor outside the multiprocessor system.

Loading the program instructions and data of the second application into the one or more memories may include sending the instructions and data through the multiprocessor system along two or more swapping routes (communication routes are one means of physically implementing the communication in a multiprocessor system). Each of the swapping routes may be associated with a particular memory and may be used to load instructions/data into that memory. In some embodiments the two or more swapping routes may share a first part in common, referred to as the trunk part of the swapping routes. The trunk part may include a route from an I/O port of the multiprocessor system to an endpoint within the multiprocessor system. The second parts of the swapping routes may connect the endpoint of the trunk route to the target memory devices used by the second application.

In some embodiments the first application may be swapped with the second application in response to receiving information from one of the other applications executing on the multiprocessor system, e.g., where the information indicates that the first application should be swapped out. In other embodiments the swapping may include swapping out the first application in response to receiving an external signal indicating that the first application should be swapped out. The external signal may be received from outside the multiprocessor system. For example, in some embodiments the external signal may be received from a system controller program that executes on a processor external to the multiprocessor system.

In some embodiments, a master task or management task may be executed on the multiprocessor system along with the plurality of applications. The management task may execute on one or more of the processors of the multiprocessor system, and may be configured to manage the swapping of the first application with the second application.

In some embodiments the second application may include a plurality of executable tasks, and swapping the first application with the second application may include configuring each of the tasks to be executed by a different processor of the multiprocessor system.

In some embodiments, swapping the first application with the second application may include simultaneously transmitting two or more instruction streams to the multiprocessor system from two or more source memory devices external to the multiprocessor system. Each instruction stream may include program instructions of the second application.

In some embodiments the swapping may include swapping the first application with a plurality of second applications simultaneously. The plurality of second applications may be simultaneously loaded into the multiprocessor system from different source memory devices.

In further embodiments, program instructions may be stored on a computer readable memory medium. The program instructions may be executable by a multiprocessor system to load a plurality of applications on the multiprocessor system. The multiprocessor system may include a plurality of processors and a plurality of memories interspersed among the processors. The loading may include distributing instructions and data from the plurality of applications among different respective ones of the plurality of memories for execution by associated processors.

The program instructions may be further executable by the multiprocessor system to initiate execution of the plurality of applications on the multiprocessor system. The plurality of applications may execute together and communicate with each other to perform a real time operation. The real time operation may perform at least one of input or output with real time data. The plurality of applications may process the real time data.

The plurality of applications may include a first application and a plurality of other applications. The program instructions may be further executable by the multiprocessor system to swap the first application with a second application, where the second application is not one of the plurality of applications that was previously loaded and executing on the multiprocessor system. The swapping may be performed without stopping the plurality of other applications. In other words, the plurality of other applications may continue to execute during the swapping to perform the real time operation and process the real time data. After the swapping, the plurality of other applications may continue to execute with the second application. At least a subset of the plurality of other applications may communicate with the second application to perform the real time operation and process the real time data.

According to some embodiments, a multiprocessor system may include: a plurality of processors; a plurality of memories interspersed among the processors; and a communication fabric interconnecting the plurality of processors and the plurality of memories interspersed among the processors. The communication fabric may include a plurality of buffer memories interspersed among at least a subset of the plurality of processors. The plurality of buffer memories may be configurable to communicate data between applications executing in the multiprocessor system. During execution of a plurality of applications on the multiprocessor system to perform a real time operation that includes receipt and/or transmission of real time data and processing of the real time data, the plurality of buffer memories may be configurable to break and restore connections between active applications during swapping of a first application with a second application.

In some embodiments the multiprocessor system may further include a plurality of data memory routers (DMRs) coupled between the plurality of processors. The DMRs may include the plurality of memories interspersed among the processors.

Figure 1A:
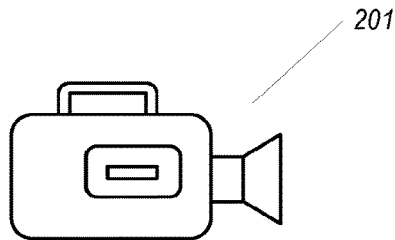
FIG. 1A illustrates an example video camera.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

Incorporation by Reference

U.S. Pat. No. 7,415,594 titled "Processing System With Interspersed Stall Propagating Processors And Communication Elements" whose inventors are Michael B. Doerr, William H. Hallidy, David A. Gibson, and Craig M. Chase is hereby incorporated by reference in its entirety as though fully and completely set forth herein.

U.S. patent application Ser. No. 13/274,138, titled "Disabling Communication in a Multiprocessor System", filed Oct. 14, 2011, whose inventors are Michael B. Doerr, Carl S. Dobbs, Michael B. Solka, Michael R Trocino, and David A. Gibson is hereby incorporated by reference in its entirety as though fully and completely set forth herein.

Terms

Computer System—any of various types of computing or processing systems, including a personal computer system (PC), mainframe computer system, workstation, network appliance, internet appliance, personal digital assistant (PDA), grid computing system, or other device or combinations of devices. In general, the term "computer system" can be broadly defined to encompass any device (or combination of devices) having at least one processor that executes instructions from a memory medium.

Software Application—the term "software application" (also referred to herein as just an "application") is intended to have the full breadth of its ordinary meaning, and includes any type of program instructions, code, script and/or data, or combinations thereof, that may be stored in one or more memories and executed by one or more processors. Exemplary software applications include programs written in text-based programming languages, such as C, C++, FORTRAN, Java™, assembly language, etc.; graphical programs (programs written in graphical programming languages); assembly language programs; programs that have been compiled to machine language; scripts; and other types of executable software.

An application may execute on one or more processors of an MPS and may read data from and/or write data to one or more of the local memories of the MPS. An application may include one or more computational tasks, where each task typically runs on a single processor of the MPS and may share the processor with one or more tasks from one or more applications. The application may perform a particular function or operation. If the application includes more than one task, the tasks may communicate with each other to perform the function or operation.

The MPS may simultaneously execute a plurality of applications, e.g., where the applications execute in parallel with each other. The applications may communicate with each other, and the respective functions or operations performed by the applications may build upon each other to perform a larger or higher-level function or operation.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DETAILED DESCRIPTION

Various embodiments of a multi-processor system (MPS) and an associated method for dynamically swapping applications executing on the MPS are described. A multi-processor system (MPS) may be defined as a system that includes a plurality of processing elements (PEs). A MPS may have a plurality of memories interspersed among the PEs, or alternatively may have a single shared memory. As used herein, the term "processing element" refers to a processor or CPU (central processing unit), microprocessor, or a processor core. Although an MPS may include any number of two or more PEs, it is noted that some MPSs may include significantly more PEs than a traditional computer system which typically includes only one general purpose processor (GPP), or a few GPPs. For example, some MPSs may include 4, 8, 16, 32, or 64 PEs (other examples include, e.g., dozens, hundreds, or even thousands of PEs). In some embodiments, PEs suitable for large MPSs may be more energy efficient than general purpose processors used by traditional computer systems because of their special construction for the purpose of low power consumption.

MPS may also include an interconnection network (IN) that interconnects the PEs and/or memories. The PEs and memories may be interconnected in one, two, three, or more dimensions, including circular dimensions (e.g., loops or rings). A higher-dimensioned MPS can be mapped onto fabrication media with fewer dimensions. For example, an MPS with the shape of a four dimensional (4D) hypercube can be mapped onto a 3D stack of silicon integrated circuit (IC) chips, or onto a single 2D chip, or even a 1D line of computational units. Also, low-dimensional MPSs can be mapped to higher dimensional media. For example, a 1D line of computation units can be laid out in a serpentine shape onto the 2D plane of an IC chip, or coiled into a 3D stack of chips. An MPS may include multiple types of computational units and interspersed arrangements of processors and memory. Also included in the broad sense of an MPS is a hierarchy or nested arrangement of MPSs, especially an MPS composed of interconnected IC chips where the IC chips contain one or more MPSs which may also have deeper hierarchal structure.

As used herein, the term MPS covers both relatively homogeneous sets of processors, as well as heterogeneous collections of general purpose, and specialized processors that are integrated on so-called "platform IC" chips. Platform IC chips may contain from a few to many processors, typically interconnected with shared memory and perhaps an on-chip network. There may or may not be a difference between a MPS and a "platform IC" chip. However, a "platform IC" chip may be marketed to address specific technical requirements in a specific vertical market.

In general, the memory for an MPS may be organized in a hierarchy with fast memory at the top and slower but higher capacity memory at each step down the hierarchy. In an MPS, supporting memories at the top of the hierarchy may be located nearby each PE. Each supporting memory may be specialized to hold only instructions or only data. Supporting memory for a particular PE may be private to that PE or shared with other PEs.

Further down the memory hierarchy there may be a larger shared memory, such as a semiconductor synchronous dynamic random access memory (SDRAM) with a bit capacity many times larger than that of the supporting memory adjacent to each PE. Further down the memory hierarchy there may be other types of memory, such as flash memory, magnetic disks, and optical disks.

The MPS may be programmed with software applications to accomplish specific operations. Each of the applications may be executed by one or more of the PEs in the MPS. Oftentimes, multiple applications may execute concurrently with each other on the MPS. The applications may execute together and communicate with each other to perform a real-time operation. The real-time operation may perform input and/or output with real-time data. For example, the MPS may receive real-time data via an input signal. One or more of the applications may process the input signal, and possibly produce an output signal with modified or additional real-time data based on the processing.

At some point during the execution of the system, it could be determined that a particular application may not need to execute. For example, that application may become idle and remain idle for a long period of time, or that application's priority could be lower than another application that is waiting to run, or another application could need access to specific resources that are being used by the application. It thus may be advantageous to stop the execution of the running application and allow another application to use the newly available processor resources. This is referred to herein as "swapping out" the application that was previously running, and "swapping in" the other application.

Embedded systems usually need to remain active and continue to function, and generally cannot be arbitrarily stopped. An example is a system that controls a critical safety device, where stopping the system might produce an unsafe situation. As another example, where the embedded system is processing video and/or audio for presentation to a user or transmission, stopping the embedded system may cause undesirable artifacts in the media data. In an embedded system, the process by which applications are stopped and started may thus need to be handled carefully. The swapping method described herein may enable applications to be swapped without stopping the system. For example, applications other than the applications being swapping in/out that are currently executing on the MPS may continue to execute while the swapping occurs. In addition, the swapping method may also enable the swapping to be done quickly to ensure that the system is complete and remains functioning smoothly.

The swapping method described herein may account for resource limitations of particular MPSs. Such limitations may include the amount of instruction memory available for each PE, the amount of data memory available for each PE, the bandwidth of communication between PEs, the bandwidth of communication between the PEs and external memory, etc. For example, an MPS in which the PEs have limited instruction memory may require new instructions to be moved into instruction memory from external storage in order to initialize a new application. The swapping method may thus be sensitive to a resource-limited MPS. As described in detail below, the swapping method may enable a first application (or first set of applications) to be safely stopped and its processing resources freed for other uses, and further enable a second application (or second set of applications) to be quickly and safely started running on available processing resources.

During the swapping process, other applications executing in the embedded system may continue to operate, and may be unaware that the swapping is being performed. Furthermore, the applications that are swapped in or out may not be "swapping aware" themselves. In other words, the swappable applications may not need to be specially constructed. This may advantageously enable the swappable applications to be easily constructed, e.g., by writing or developing them as normal applications in the conventional manner without the need to include special program logic to implement the swapping. The program code that implements the swapping may be implemented in other components external to the swappable applications themselves.

FIGS. 1A-3B Examples of Dynamically Re-Configurable MPSs in Embedded Systems

FIGS. 1A-3B illustrate several examples of re-configurable MPSs, e.g., where the MPSs are configured to dynamically swap applications in and out according to the techniques described herein. Each MPS may be part of an embedded system that operates in a device to perform a real-time operation. It is noted that FIGS. 1A-3B are examples only, and any of various other types of embedded systems may use the methods described herein.

Figure 1B:
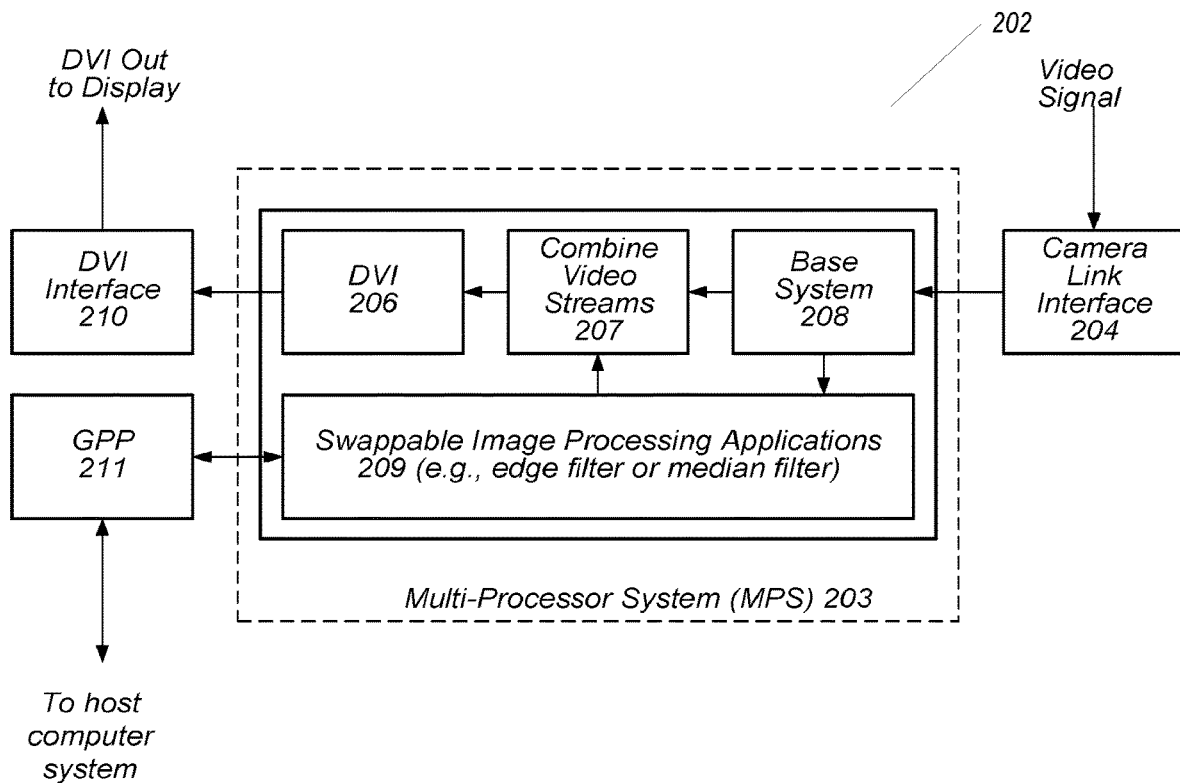
FIG. 1B illustrates an embedded system that may be included in or coupled to the video camera, where the embedded system utilizes a multiprocessor system (MPS) configured with swappable applications.

FIG. 1A illustrates a video camera 201, and FIG. 1B illustrates an embedded system 202 that may be included in or coupled to the video camera 201. As shown in FIG. 2B, the embedded system 202 includes a camera link interface 204 that receives a video signal from the video camera 201, and passes it to the MPS 203. In this example, the MPS 203 includes a base system 208 that receives the raw video stream and performs basic processing, such as de-mosaicing and color space conversion to transform the raw camera data into data that is consumable by the downstream filters. The base system 208 may provide the transformed data to one or more image processing applications 209. The image processing applications may include at least two applications, where each one is configured to filter or otherwise process the video data in any of various ways. The image processing applications may be dynamically swapped in and out to change the way the video signal is processed. As one example, the system may initially execute an edge filter application that performs an edge filtering algorithm on the signal. In response to user input or other conditions, the edge filter application may be dynamically swapped with a median filter application that performs a median filtering algorithm on the signal. The result of the current image processing application may be combined with the original data produced by the base system 208 by the "combine video streams" block 207, e.g., in a split-screen display. The combined signal may then pass via the digital video interface (DVI) block 206 to the DVI interface 210, which is coupled to a display device. Thus, the result of swapping the edge filter application and the median filter application may be viewed on the display device in real time. The video stream may also be passed to the general-purpose processor (GPP) 211. A program executing on the GPP 211 may also provide control signals to the MPS to direct which filter should execute on MPS 203.

Figure 2A:
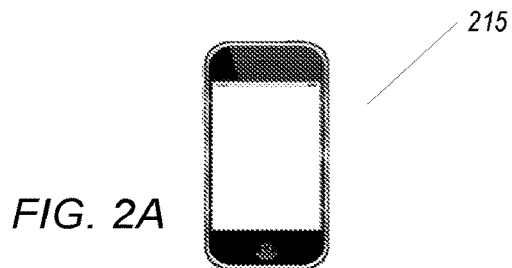
FIG. 2A illustrates an exemplary cellular phone.
Figure 2B:
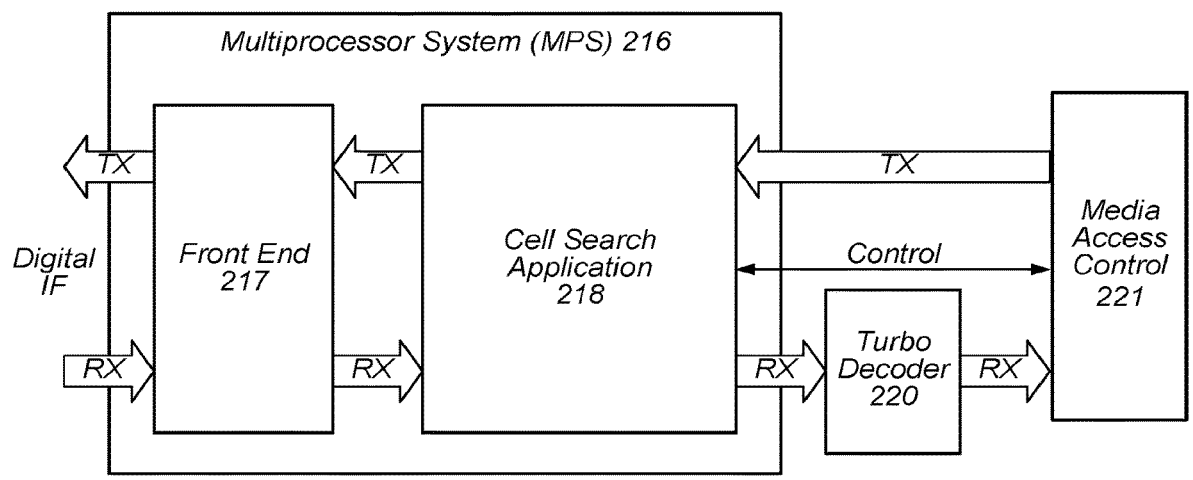
FIGS. 2B and 2C illustrate an MPS used in the phone, where the MPS is configured with swappable applications.
Figure 2C:
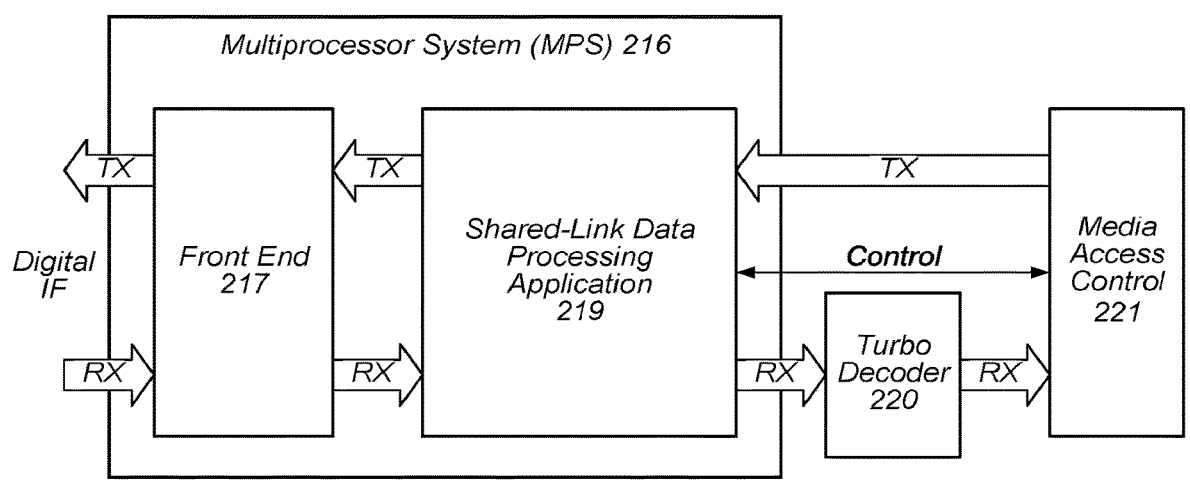

FIG. 2A illustrates a cellular phone 215, and FIGS. 2B and 2C illustrate an MPS 216 used in the phone. In the configuration of the MPS shown in FIG. 2B, the MPS is currently executing a cellular search application 218. The phone uses the Long Term Evolution (LTE) 4G cellular telecom radio interface technical standard. In accordance with the LTE standard, the phone first registers with a local cellular base station using the cellular search application 218. Once registered, the cellular search application 218 is no longer needed. Thus, the cellular search application 218 may be dynamically replaced with a different application, e.g., the shared-link data processing application 219 shown in FIG. 2C. The front end application 217 performs re-sampling and up/down conversion, and it remains executing on the MPS while this swapping occurs. If the MPS is sufficiently large (e.g., 100+ processors) then a portion of the cellular search and shared-link data processing applications may remain loaded at all times, e.g., instead of entirely loading and unloading them when they are swapped.

In this example, the desired time interval for cut over from the cellular search application to the shared-link data processing application, and the reverse in the event of a need to re-register, is 4 ms. If the cut-over is too slow the media access controller 221 reverts to re-registration. The cellular search application performs many CRC computations in parallel and upon finding a true signal the phone locks onto that one signal. There is a short interval while the media access controller completes the registration process and requests data slots in the shared link. The media access controller is designed to look ahead of the currently transmitted data in order to properly reserve slots. Typically it looks ahead by 4 subframes, or about 4 milliseconds, and thus, this is the desired interval for cut-over to the shared-link data processing application.

Figure 3A:
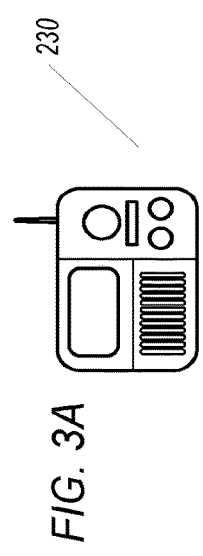
FIG. 3A illustrates a wireless transmitter/receiver device.
Figure 3B:
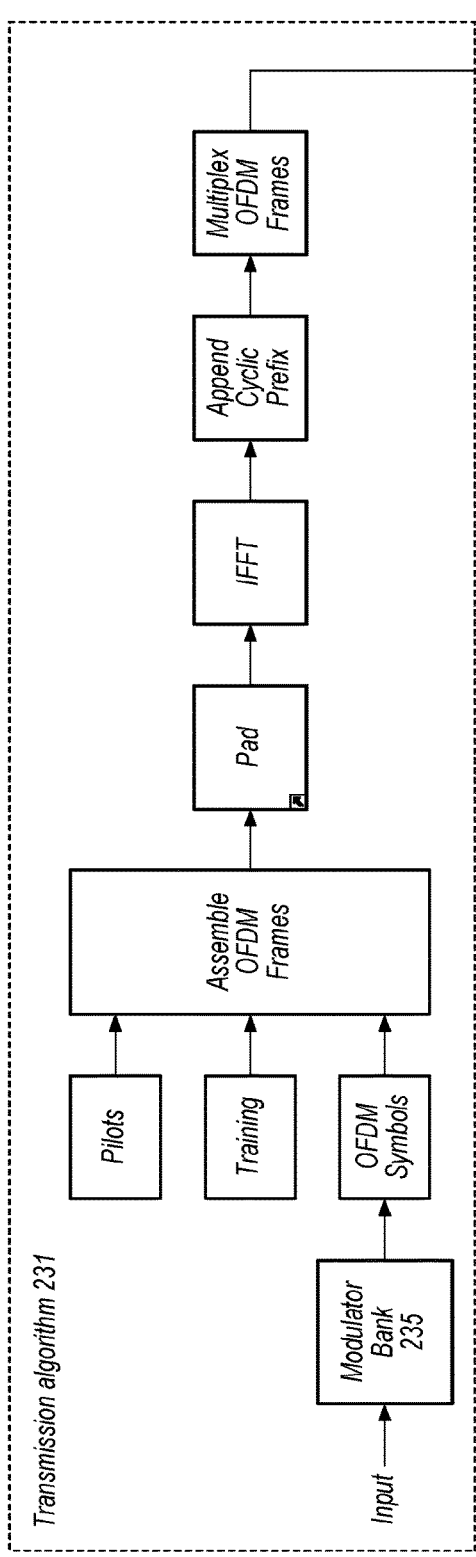
FIG. 3B illustrates a communication algorithm that may be performed by the wireless device, where the communication algorithm is implemented using swappable applications that execute on an MPS.
Figure 3B:
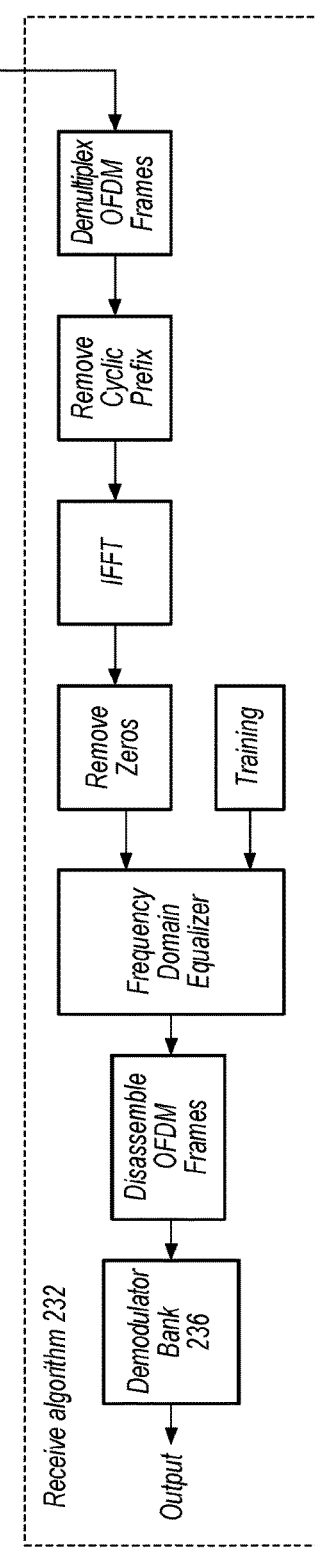

FIG. 3A illustrates a wireless transmitter/receiver device 230. Device 230 may instead be a receiver only device, such as a radio. FIG. 3B illustrates a communication algorithm that may be performed by the wireless device 230. The top part illustrates the transmission portion 231 of the algorithm, and the bottom part illustrates the receive portion 232 of the algorithm. The modulator bank 235 performs a modulation algorithm, and the demodulator bank 236 performs a de-modulation algorithm. The modulator bank 235 and possibly other parts of the transmission portion 231 of the algorithm may be implemented on a MPS that uses a plurality of modulator applications. At any given time, only one of the modulator applications may be loaded and executing. The MPS may be configured to dynamically swap the currently loaded modulator application for a different one in order to change the particular modulation algorithm in use. Different de-modulation applications may be swapped in and out in a similar manner to dynamically change the de-modulation algorithm performed by the demodulator bank 236. Portions of the communication algorithm not necessary to understand the present disclosure are omitted from this description.

It is noted that FIGS. 1A-3B are presented as examples of devices in which an MPS that is configured to dynamically swap software applications may be used. In various embodiments an MPS such as described herein may be used in any kind of device or system. Also, the applications that are swapped in and out may be any kind of software applications, e.g., applications that process real-time data in any of various ways, or perform any of various other kinds of functions to implement a real-time operation or other operation performed by a device or system.

FIGS. 4-12 Example MPS Architecture

Figure 4:
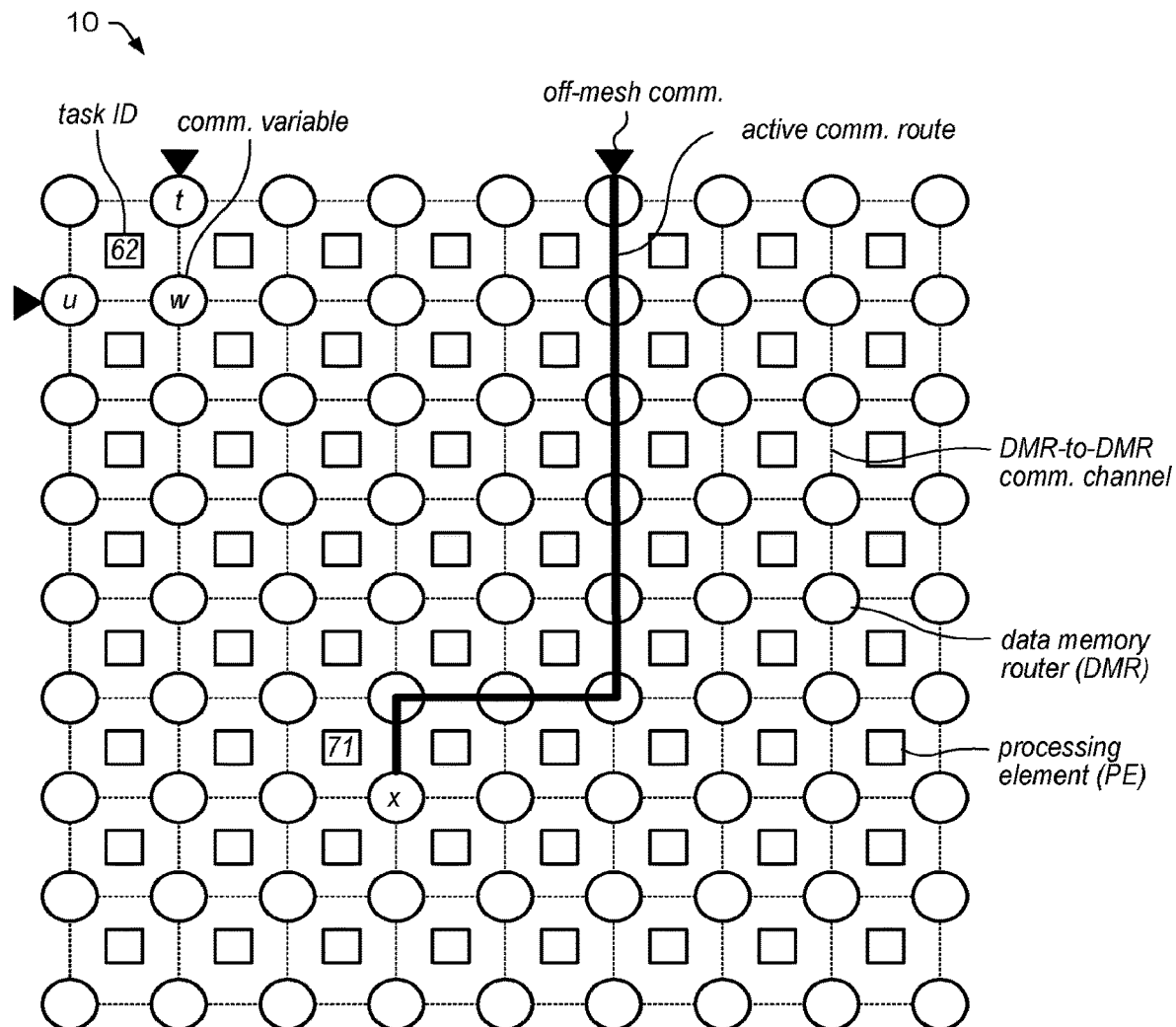
FIGS. 4-6 illustrate an example of a HyperX™ architecture for an MPS according to one embodiment.
Figure 5:
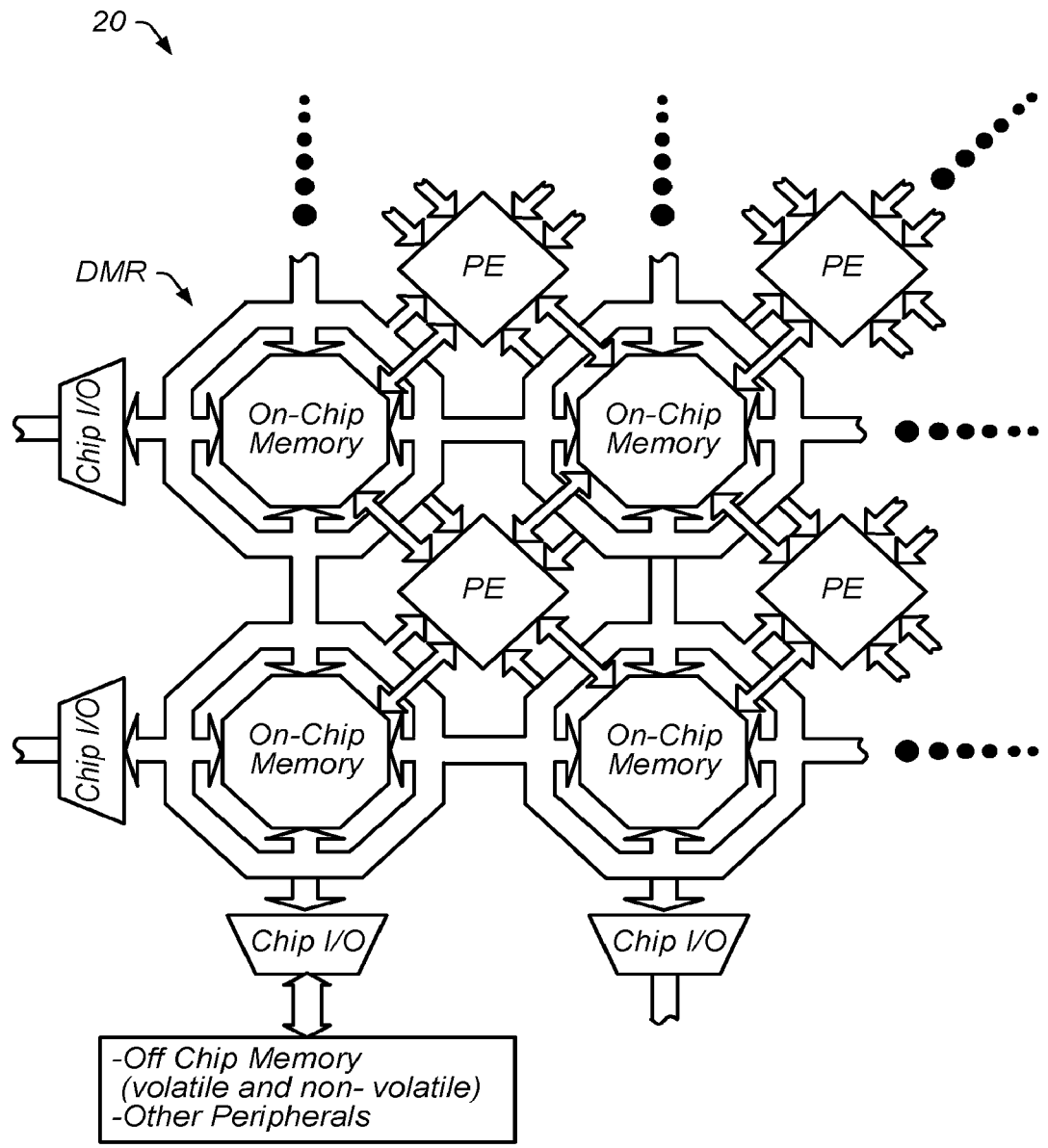
Figure 6:
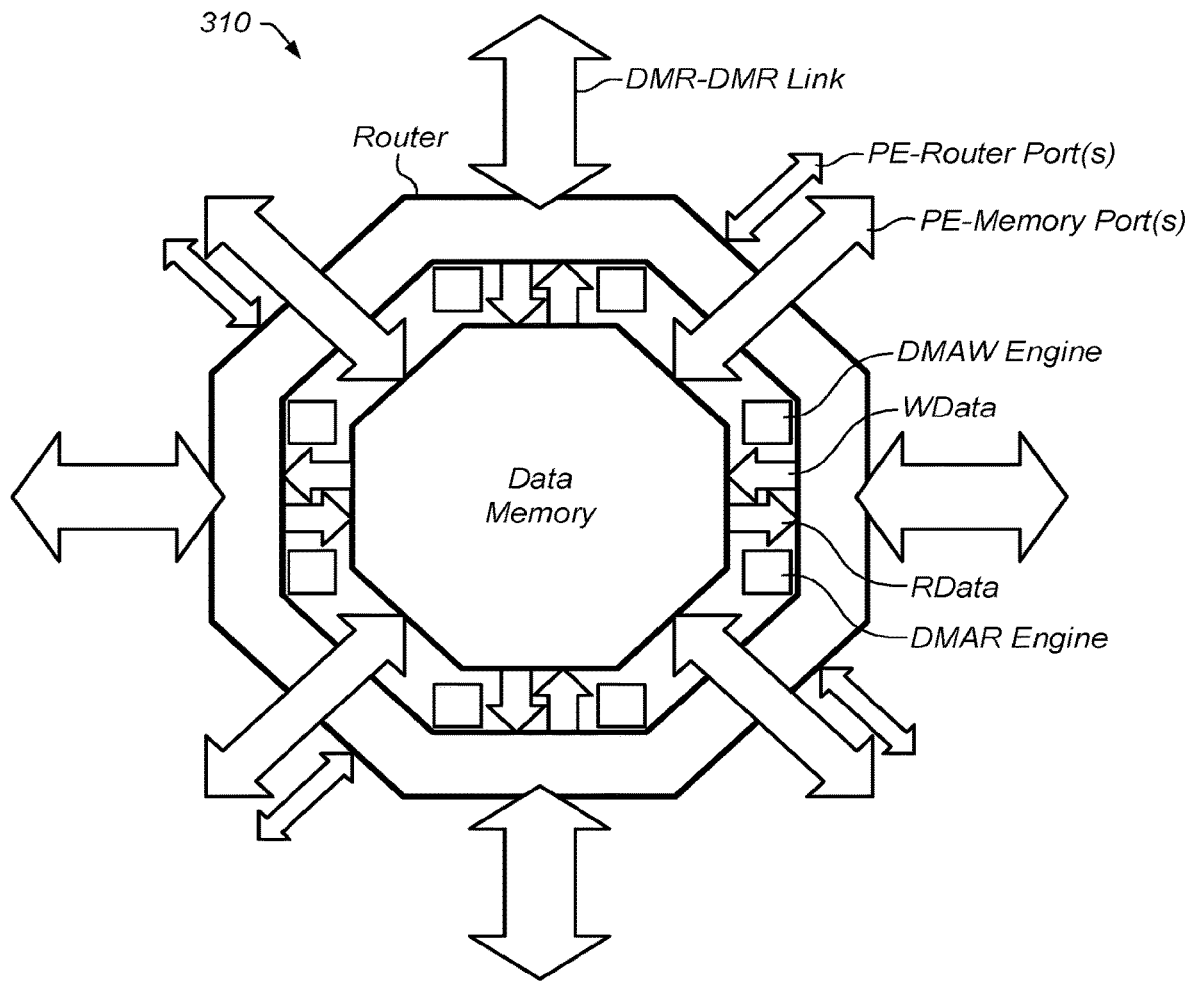
Figure 7:
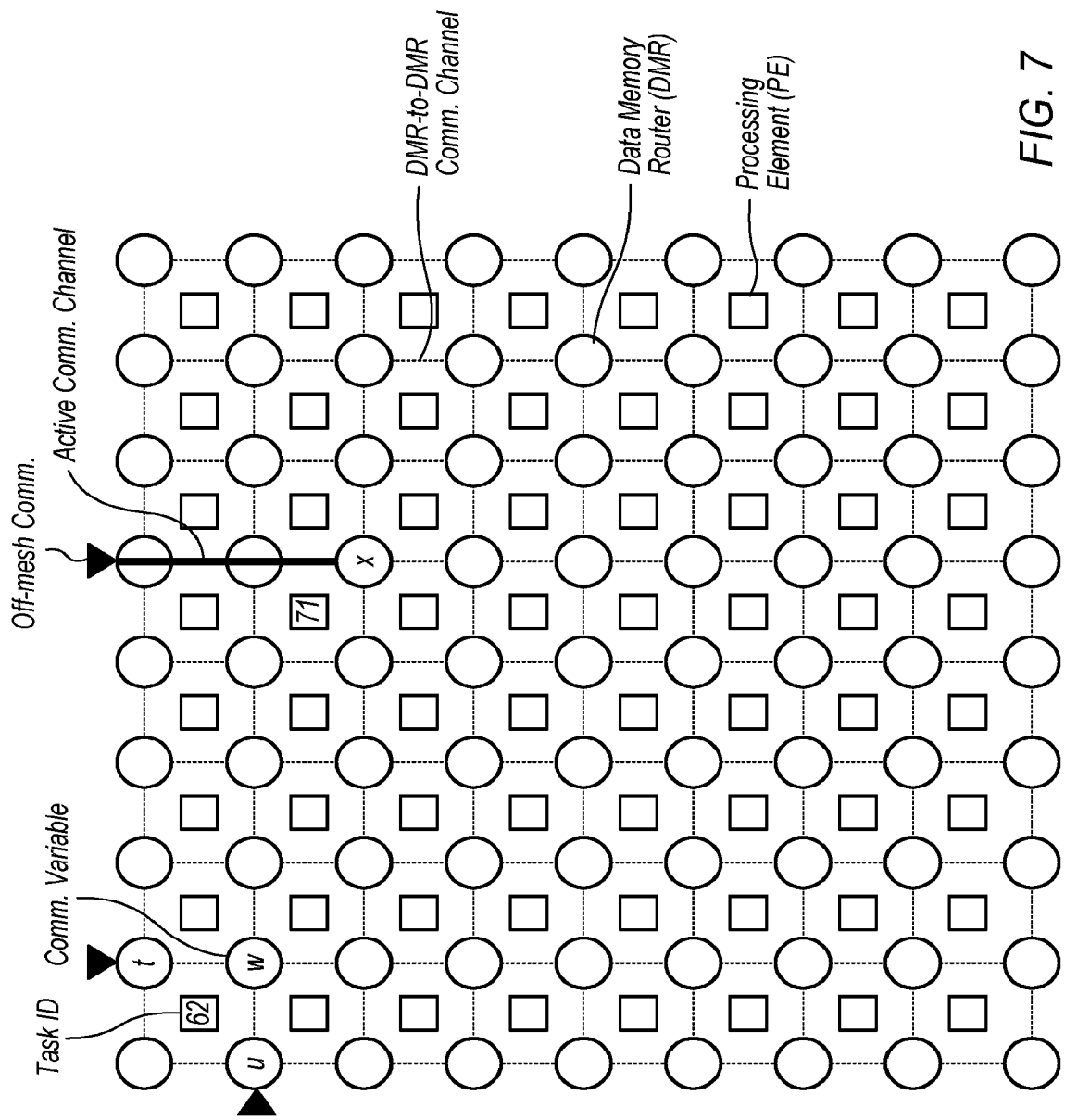
FIGS. 7-12 illustrate an example trace of an algorithm executing on an MPS according to one embodiment.

In various embodiments, the application swapping techniques described herein may be utilized on any of various kinds of MPSs. The MPS may have any desired architecture. FIGS. 4-6 illustrate an example architecture for an MPS according to one embodiment. This MPS architecture is an example of HyperX™ architecture disclosed in U.S. Pat. No. 7,415,594. This architecture may be suitable to implement a programmable, very low-power, low-cost many-processor embedded computer system (here embodied as a single integrated-circuit chip) with the capability to simultaneously run many applications. The following description of the HyperX™ architecture is merely an example, and any of various other MPS architectures may be used, as desired.

In the embodiment illustrated in FIG. 4, the MPS 10 includes a plurality of processing elements (PEs) represented as squares. The MPS also include a plurality of data memory routers (DMRs) represented as circles. The DMRs act as supporting memories for the adjacent PEs, as well communication routers or switch nodes. Lines between the DMRs illustrate DMR-to-DMR communication channels or links that implement an interconnection network (IN). The DMRs may be used with the links to form communication pathways between PEs, as well as between PEs and I/O ports that couple the MPS to external devices. At each PE, any information communicated may be buffered in a memory in an adjacent DMR. As used herein, a PE may also be referred to as a PE node, and a DMR may also be referred to as a DMR node. A DMR is also referred to herein as a "configurable communication element".

The links between DMRs shown in FIGS. 4 and 5 form a rectilinear mesh. However, many other connection schemes are possible and contemplated. In the MPS connection scheme illustrated in FIG. 5, each PE is connected to four neighbor DMRs, while each DMR is connected to four neighbor PEs as well as four neighbor DMRs. Other connection schemes are also envisioned to support higher dimensionality INs, such as the use of six DMR-to-DMR links per DMR to support a three dimensional rectilinear mesh, or eight links per DMR to support the four diagonal directions in addition to the north, east, south, and west directions. Links need not be limited to physically nearest neighbors.

MPS 20 with chip I/O's may be used in any of various systems and applications where general purpose microprocessors, DSPs, FPGAs, or ASICs are currently used. For example, the processing systems illustrated in FIGS. 4 and 5 may be used in any of various types of computer systems, digital signal processors (DSP) or other devices that require computation.

HyperX Hardware Fabric

In one embodiment of the HyperX™ architecture, a multi-processor array may be composed of a unit-based hardware fabric (mesh), wherein each unit is referred to as a HyperSlice. The hardware fabric may be formed by arranging the units on a grid and interconnecting adjacent units. Each HyperSlice unit may include one or more data memory and routers (DMRs) and one or more processing elements (PEs).

In U.S. Pat. No. 7,415,594, a DMR may be referred to as a dynamically configurable communication (DCC) element, and a PE may be referred to as a dynamically configurable processing (DCP) element. The DMR may provide supporting memory for its neighboring PEs, and routers and links for the interconnection network (IN). Dynamically configurable in this context means those hardware resources (PE, DMR links, and DMR memory) may be re-allocated while application software is running. This can be achieved by dividing the application software into a hierarchy of smaller tasks and communication messages. These tasks and messages may be assigned to resources and executed concurrently (or serially if required). As tasks and messages are completed they may be re-executed or be replaced by other tasks and messages to form a new configuration of the application software. The capability to change configuration "on the fly" supports the flexibility to make more efficient use of finite resources, and to better adapt to changing external demands, amongst others.

The HyperX™ hardware fabric has a primary IN (PIN) that operates independently and transparently to the processing elements, and may provide on-demand bandwidth through an ensemble of real-time programmable and adaptable communication pathways (which may be referred to as routes or paths) between HyperSlices supporting arbitrary communication network topologies. Coordinated groups of HyperSlices may be formed and reformed "on-the-fly" under software control. This ability to dynamically alter the amount of hardware used to evaluate a function allows for the optimal application of hardware resources to relieve processing bottlenecks. At the edge of the hardware fabric, links may connect to circuits specialized for types of memory that are further down the memory hierarchy, or for I/O at the edge of an integrated circuit (IC) chip.

The interconnected DMRs of the HyperX™ hardware fabric may provide nearest-neighbor, regional, and global communication across the chip and from chip to chip. Each of these communication modes may physically use the DMR resources to send data/messages differently depending on locality of data and software algorithm requirements. A "Quick Port" facility may be provided to support low latency transfer of one or more words of data from a processor to any network destination. For block transfers, Direct Memory Access (DMA) engines within the DMR may be available to manage the movement of data across the memory and routing fabric (or communication fabric). For nearest-neighbor communication between PEs, the use of shared memory and registers may be the most efficient method of data movement. For regional and global data movement, using the routing fabric (the PIN) may be the most efficient method. Communication pathways (or routes) can either be dynamic or static. Dynamic routes may be set up for data transfer and torn down upon the completion of the transfer to free up PIN resources for other routes and data transfers. Static routes may remain in place throughout the program execution and may be primarily used for high priority and critical communications. The physical location of communication pathways and the timing of data transfers across them may be under software program control. Multiple communication pathways may exist to support simultaneous data transfer between any senders and receivers.

Processing Elements (PE)

The architecture of the DMR may allow different interchangeable PEs to be used in a multi-processor fabric to optimize the system for specific applications. A HyperX™ multiprocessor system may comprise either a heterogeneous or homogeneous array of PEs. A PE may be a conventional processor, or alternatively a PE may not conform to the conventional definition of a processor. In some embodiments a PE may be a collection of logic gates serving as a hard-wired processor for certain logic functions where programmability is traded off for higher performance, smaller area, and/or lower power.

As illustrated in FIG. 5, PEs in an MPS, such as a HyperX™ MPS, for example, may be supplied with parallel connections to multiple memories by interspersing DMRs between the PEs. Such an arrangement may reduce the time and energy required for a given PE to access memory in a DMR relative to a segregated (i.e., non-interspersed) arrangement, and may be referred to herein as an interspersed arrangement.

In the embodiment of FIG. 4, the ratio of PEs to DMRs is roughly 1:1. Different ratios of PEs to DMRs may be possible in various other embodiments.

A HyperX™ processor architecture may include inherent multi-dimensionality, but may be implemented physically in a planar realization. The processor architecture may have high energy-efficient characteristics and may also be fundamentally scalable (to large arrays) and reliable—representing both low-power and dependable notions. Aspects that enable the processor architecture to achieve high performance may include the streamlined processors, memory-network, and flexible IO. The processing elements (PEs) may be full-fledged DSP/GPPs and based on a memory to memory (cacheless) architecture sustained by a variable width instruction word instruction set architecture that may dynamically expand the execution pipeline to maintain throughput while simultaneously maximizing use of hardware resources.

Setup of Communication Pathways

FIG. 4 illustrates an embodiment of a HyperX™ system, including a network of processing elements (PEs) and Data Memory Routers (DMRs). The PEs are shown as rectangular blocks and the DMRs are shown as circles. The routing paths between DMRs are shown as dotted lines. Solid triangles show off-mesh communication and solid bold lines show active data communication between DMRs. A computational task is shown by its numerical identifier and is placed on the PE that is executing it. A data variable being used for communication is shown by its name and is placed on the DMR that contains it. In the illustrated embodiment, the top left PE has been assigned a task with task ID 62, and may communicate with other PEs or memory via the respective DMRs adjacent to the PE, designated by communication path variables t, w, and u. As also shown, in this embodiment, an active communication route connects a PE designated 71 (e.g., another task ID) to an off-mesh communication path or port via an adjacent DMR labeled "x."

Data Memory Router

A block diagram of an example embodiment of DMR hardware structure is illustrated in FIG. 6. In the illustrated embodiment, a central data memory (DM) is surrounded by an octagonal ring representing a router. It is noted that the octagonal shapes shown are merely symbolic, and that actual shapes may be different, e.g., may be rectangular. Surrounding the DMR are a number of bi-directional arrows representing data paths to other DMRs and PEs. These bidirectional data paths may be implemented with actual bidirectional transceivers at each end, or as a pair of unidirectional paths directed oppositely.

Unidirectional arrows between the router and the data memory in FIG. 6 represent unidirectional data paths between memory and router. A small square near theses arrows represents a DMA engine, i.e., a DMA reader (DMAR) to support readout from DM, and/or a DMA writer (DMAW) to support writing data to DM. A DMAR engine generates address signals for the memory, typically to increment across a buffer, reading data to send out a link to another DMR. Similarly, a DMAW engine generates address signals for the memory, typically to increment across a buffer, writing data that it receives from a link. Each DMA engine is much smaller than a PE and uses less power, so they are attractive to use for reading and writing of blocks of memory. DMA engines may be configured by PE writes to associated configuration registers in the DM memory space. Writing to a particular address triggers a DMA to start incrementing. When a DMA finishes incrementing through a block of addresses, it stops—unless configured to continue looping, either indefinitely or for a predefined number of loops.

To support high-bandwidth ports in an MPS, such as MPS 20 as illustrated in FIG. 5, the connections or links between ports (PE-to-DMR, or DMR-to-DMR) may be short (i.e., limited to neighbors) and composed of many parallel electrically-conductive traces or "wires" or "lines". In some embodiments a link may be composed of only a few parallel traces, one trace, or a waveguide.

The PE-to-DMR connections may separate traces for memory addresses from traces for data. Traces for data may be connected to transceivers to support bidirectional data transfer or separated into one set of traces to bring write data to memory and another set of traces to bring read data from memory. The DMR-to-DMR connections may not necessarily have address lines but may have lines to signify special words in the data transferred, such as control words for message header or message termination.

All DMR connections may have additional lines for flow control, For example, a line may signal upstream (from destination to source) that further progress of data words is blocked either because there is some other communication path in the way or the destination cannot accept more data. Another line may signal downstream (from source to destination) that valid data is ready. Both the upstream and downstream signaling may be used to indicate the state of transmitters and receivers connected to the ends of a link between DMRs, either local (adjacent) DMRs or global (non-adjacent) DMRs. In some MPS embodiments, communication between nodes may be under programmer control.

FIGS. 7-12 illustrate an example trace of an algorithm executing on an MPS. The algorithm is deliberately simple and sparse for illustrative purposes. The algorithm brings sample data onto the MPS, processes the data, and then sends the result off the MPS. Then the algorithm starts over at the beginning, and brings the next set of sample data onto the mesh.

Figure 8:
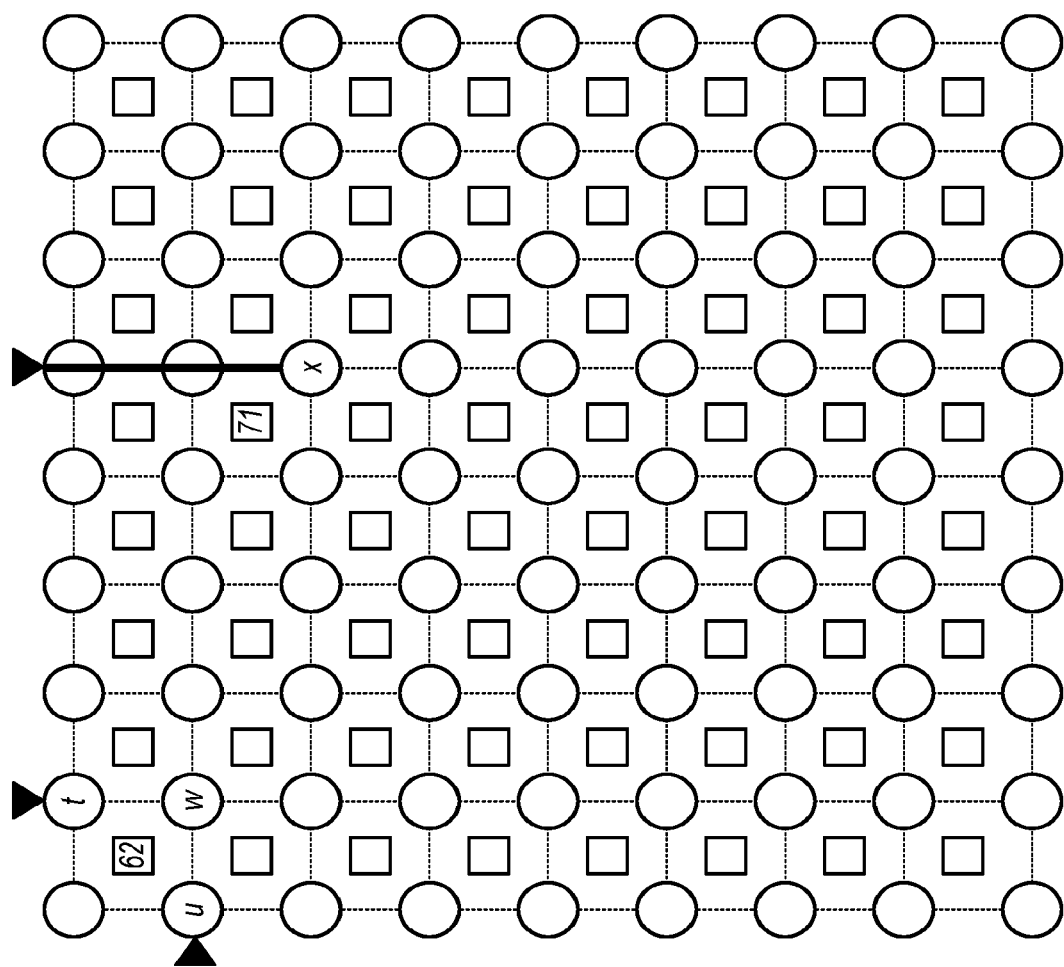
Figure 9:
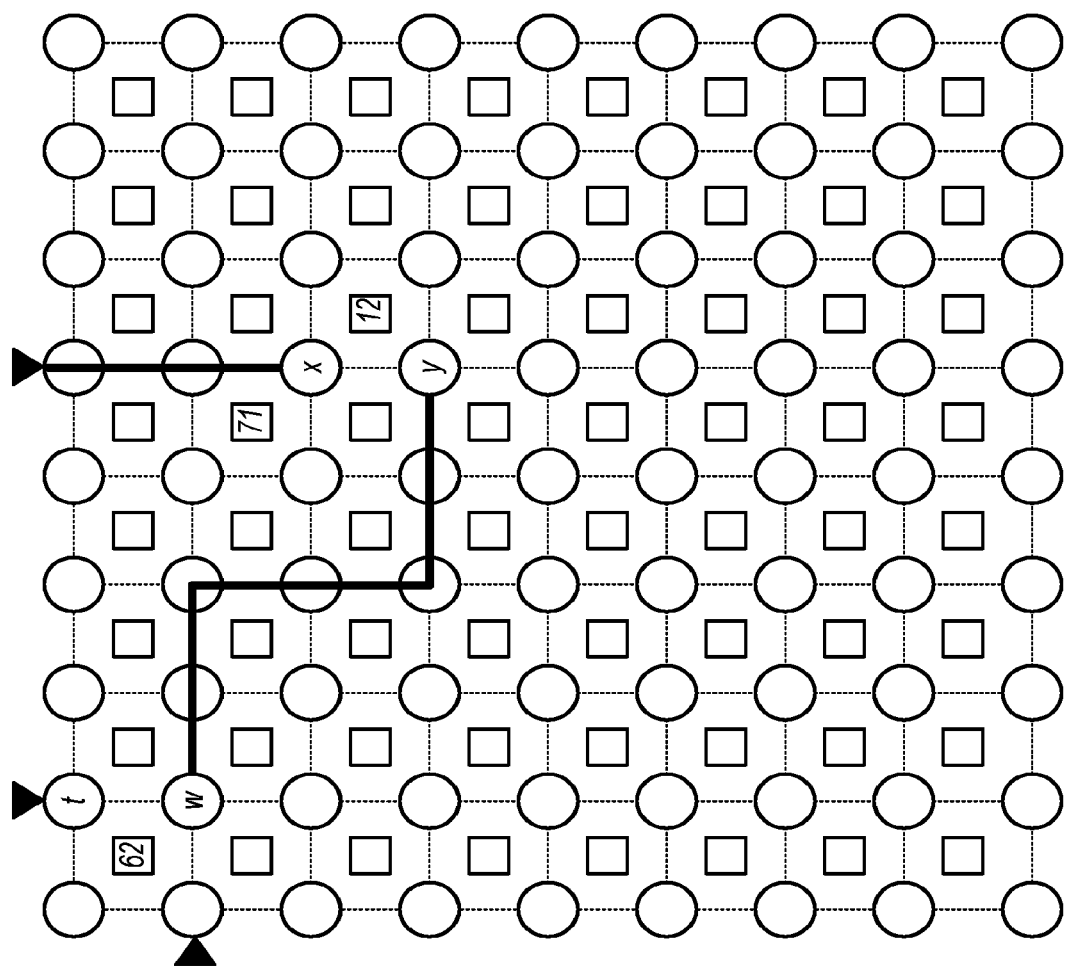
Figure 10:
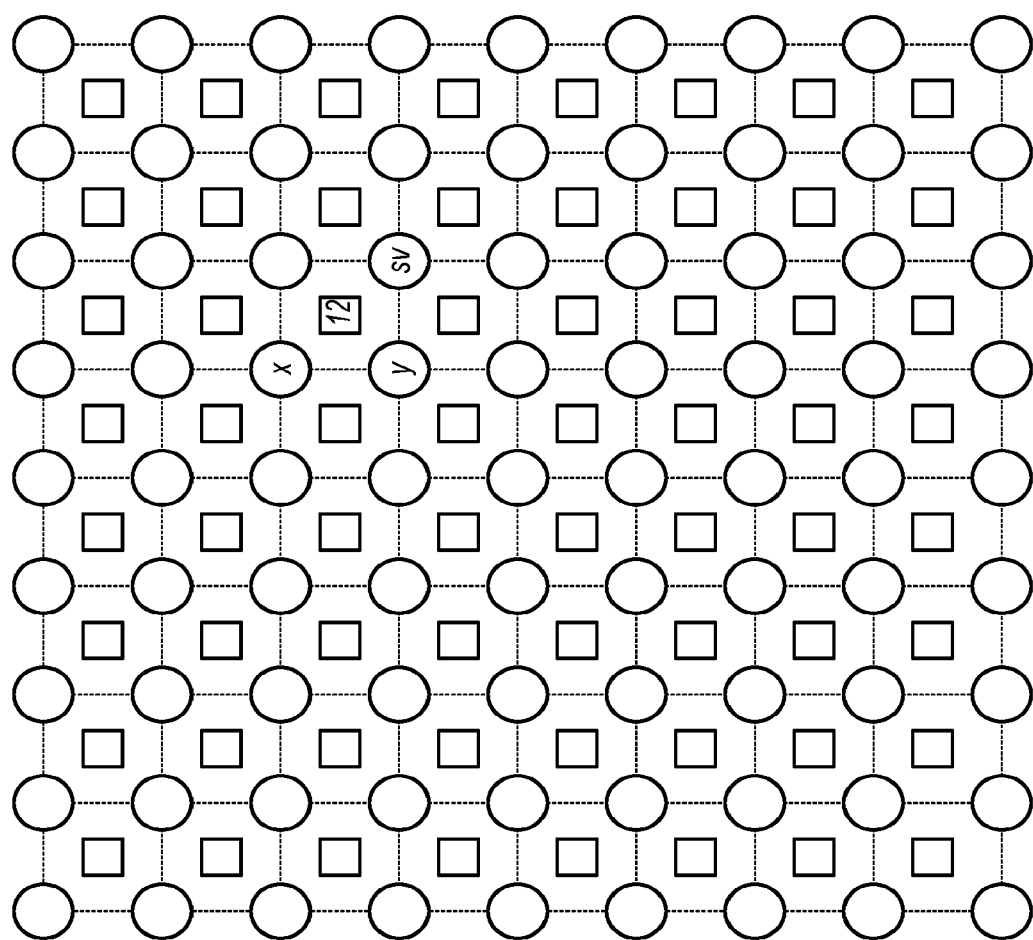

In FIG. 8, task 62 is reading data from sources external to the MPS and storing the data in variables "t" and "u". At the same time, task 62 is combining variables "t" and "u" and writing the results into variable "w". Simultaneously, task 71 is bringing data from off-mesh and storing it in variable "x".

At some later time (FIG. 9), task 62 finishes reading variables "t" and "u" and begins transmitting variable "w" to task 12 where it will be further processed. Task 12 must wait until variable "w" and variable "x" are both available to begin its next computational task. Once the data is ready, task 12 computes variable "sv" from its inputs "x" and "y" (FIG. 10), where "sv" is a shared variable.

Figure 11:
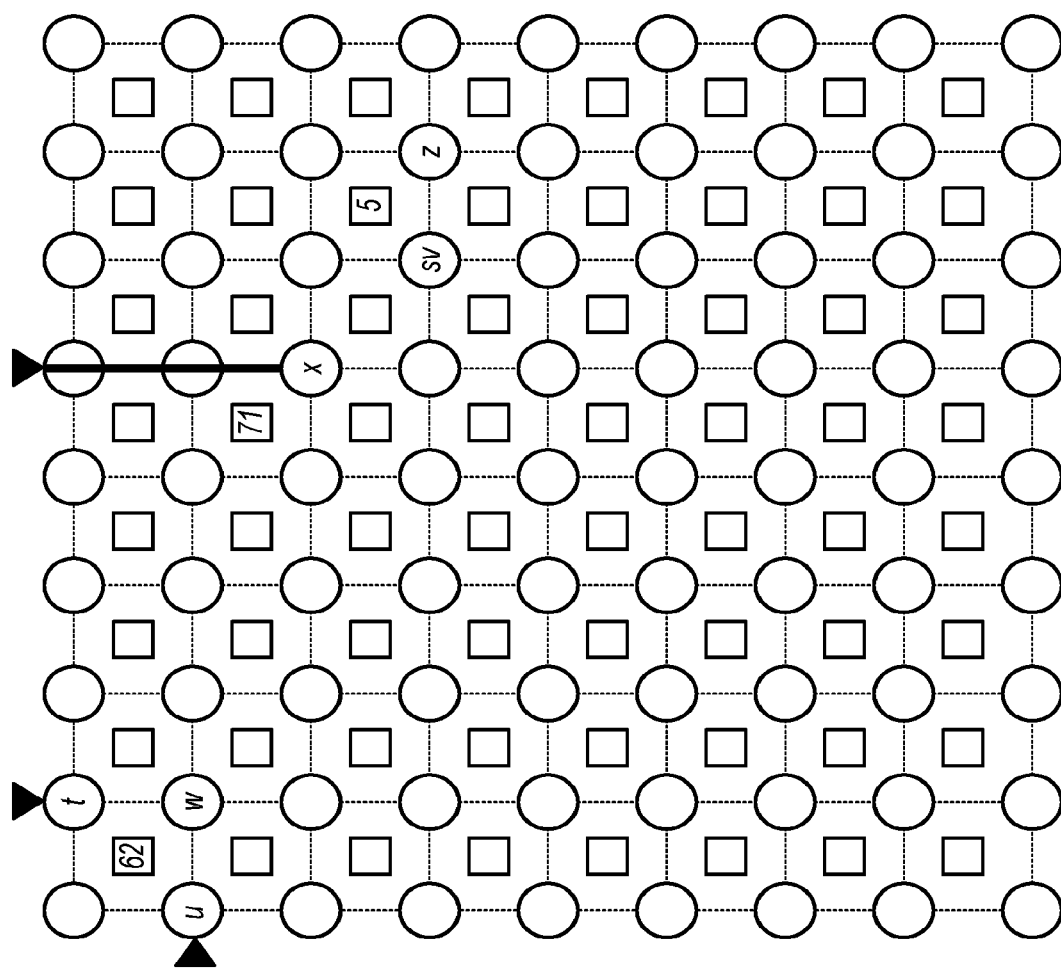

In FIG. 11, shared variable "sv" is acted on by task 5 to produce variable "z". Since "sv" is shared, there is no explicit communication between task 12 (in FIG. 10) and task 5, but there is synchronization between the tasks. Simultaneously, tasks 62 and 71 start reading the next data samples from off-mesh (as in FIG. 8).

Figure 12:
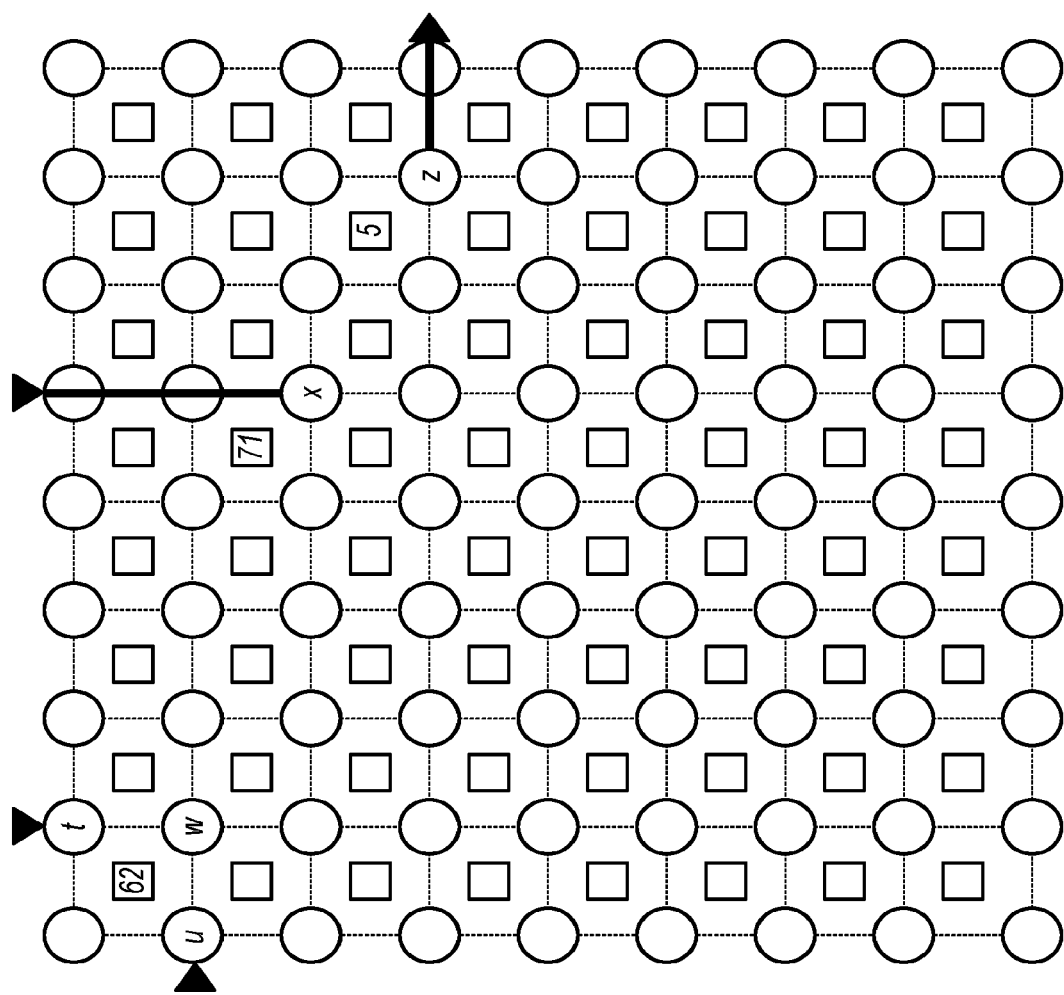

In FIG. 12, task 5 sends the final result (variable "z") off the mesh while tasks 62 and 71 continue to read the next data samples.

FIGS. 13-28—Application Swapping

Figure 13:
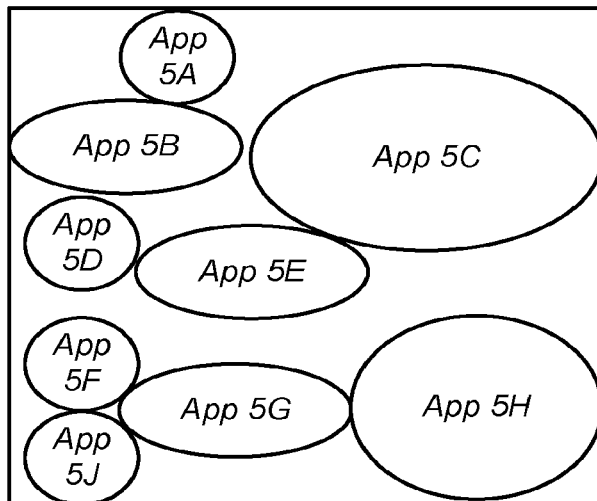
FIG. 13 illustrates an example of an MPS on which a plurality of applications are executing.

An MPS may have the capability to simultaneously run many software applications. FIG. 13 illustrates an example of an MPS 300 on which a plurality of applications are executing. In order to execute the applications, instructions and data from the plurality of applications may be distributed among different memories of the MPS for execution by processors associated with the memories. For example, program instructions and data for one of the applications may be stored in a first subset of the memories of the MPS. A first subset of the processors of the MPS may be coupled to the first subset of the memories and may execute the instructions and data for the application. Similarly, program instructions and data for another of the applications may be stored in a second subset of the memories for execution by a second subset of the processors, and so on.

In some embodiments a given memory of the MPS may be associated with or reserved for a particular processor of the MPS. In other embodiments a given memory may be shared by more than one processor of the MPS. In some embodiments the memory or set of memories used by a given processor may be physically located near the processor, e.g., such that the processor can directly access the memory without using an interconnection network or communicating with other routing elements.

In FIG. 13, the relative sizes of the ovals are intended to illustrate the relative amounts of system resources (e.g., the number of processors and memories) allocated to the applications. For example, the application 5C is represented by a large oval indicating that this application uses more of the system's processors than the application 5A which is represented by a small oval. Also, the relative placement of the ovals within the MPS 300 is intended to illustrate the physical placement of the applications on the MPS, e.g., the respective physical regions of the MPS in which the processors and memories used by each application are located. (In this example, the MPS is illustrated as having a two-dimensional layout, but in other embodiments the processors and memories of the MPS may be arranged according to a different number of dimensions, e.g., 1D, 3D, 4D, etc.)

Figure 14:
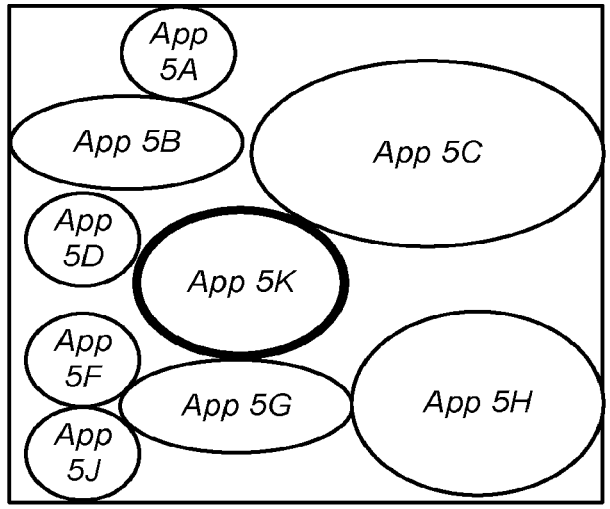
FIG. 14 illustrates the MPS of FIG. 13 after an application has been swapped out, and another application has been swapped in to take its place.

The term "application swapping" refers to the process of removing one or more applications and replacing them with one or more other applications. The swapping may occur dynamically while the other applications continue to execute. For example, FIG. 14 illustrates the MPS 300 after the application 5E has been swapped out, and the application 5K has been swapped in to take its place. The other applications 5A, 5B, 5C, 5D, 5F, 5G, 5H, and 5J can continue to execute on the MPS while the swapping between the applications 5E and 5K occurs. Although the application 5K is placed within the MPS in the same general area where the application 5E previously executed, the application 5K may not necessarily use the exact same processor and memory resources as the application 5E.

Figure 15:
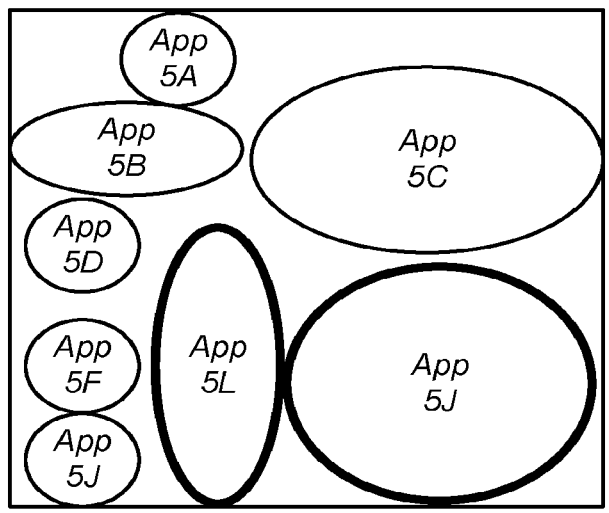
FIG. 15 illustrates the MPS of FIG. 13 after three applications have been replaced with two other applications.

The system may also swap in and/or swap out more than one application at a time. FIG. 15 illustrates an example in which the three applications 5E, 5G, and 5H from FIG. 13 have been replaced with the two applications 5L and 5J. Thus, the number, shape (in terms of physical placement), and size (in terms of processor and memory resources used) of the swapped applications do not have to be the same.

There are a numerous reasons why it may be desirable in various embodiments to remove one or more applications from a running MPS and replace it with one or more others. For example, an application may execute for a while and then not have anything to do for long stretches of time. During this time, the application's resources could be used by some other application, thereby improving the performance of the overall system. Another reason is that it might be desirable to change the functionality of the MPS by removing one application and replacing it with another application. For example, the two applications may perform the same general function but in a somewhat different way.

As described in more detail below, application swapping may include operations to dynamically load and execute an application, stop a running application, and clear the resources of a stopped application. These operations may be designed to be performed in such a way that other applications running on the MPS are not disturbed while the application swapping is in process so that the other applications can continue executing with their normal operation preserved.

Figure 16:
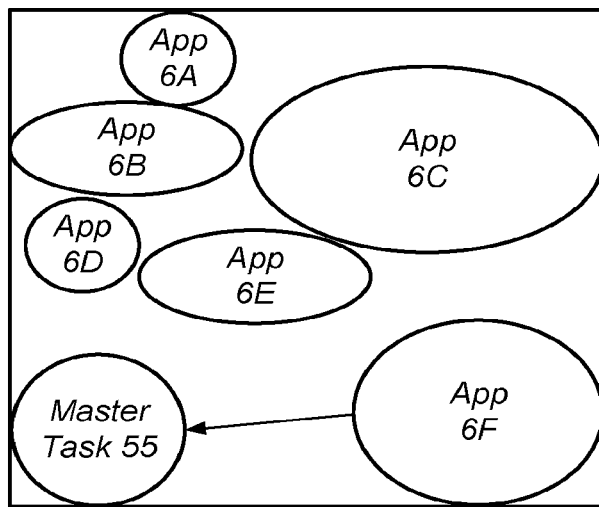
FIG. 16 illustrates an embodiment in which a master task is triggered to initiate application swapping by an application that executes internally in the MPS.
Figure 17:
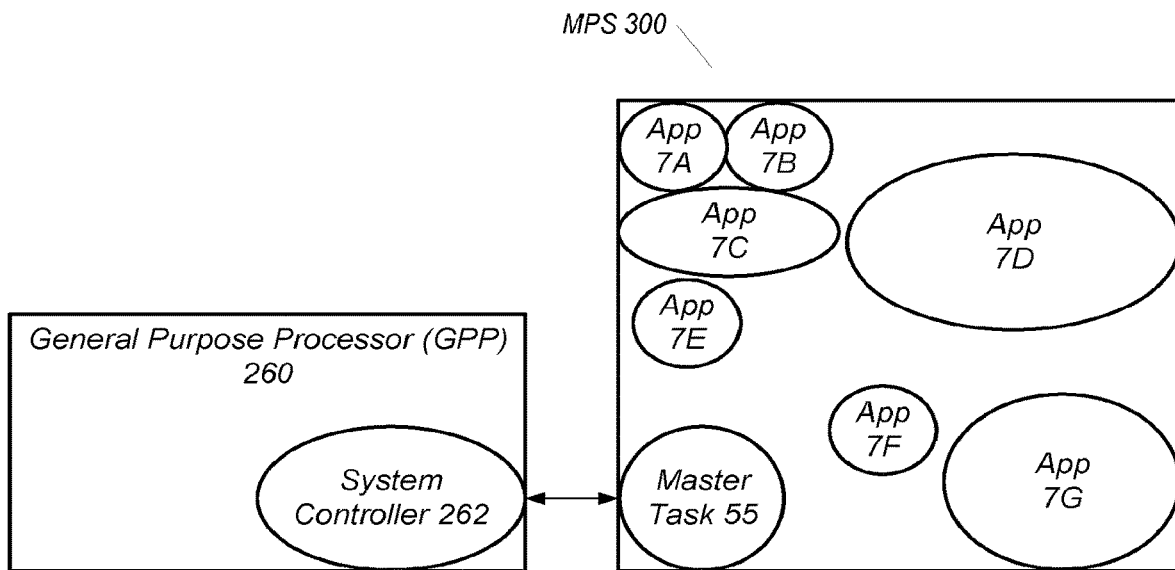
FIG. 17 illustrates a different embodiment in which the master task is triggered to initiate application swapping by a system controller program that executes on a general-purpose processor (GPP) located outside of the MPS.
Figure 18:
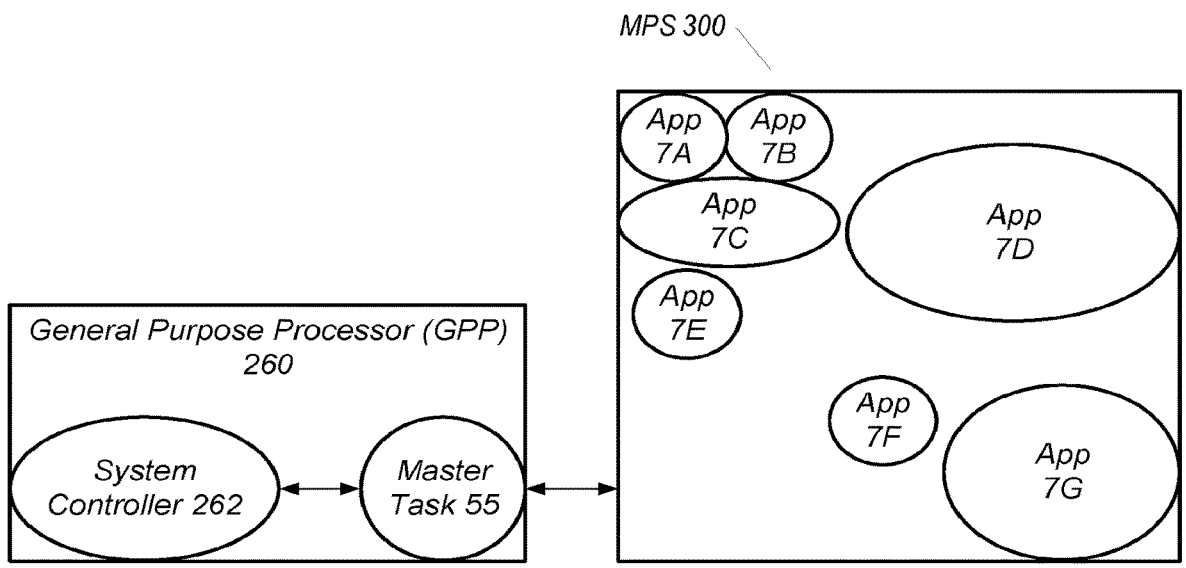
FIG. 18 illustrates an embodiment in which the master task executes on the external GPP along with the system controller.

In some embodiments, application swapping may be managed by a special task or application referred to herein as a master task or management task. The master task may be triggered from either inside or outside the MPS to initiate application swapping. FIG. 16 illustrates an embodiment in which the master task 55 is triggered to initiate application swapping by an application 6F that executes internally in the MPS. For example, the application 6F may include program logic that triggers application swapping in response to various internal state changes that occur within the application 6F. FIG. 17 illustrates a different embodiment in which the master task 55 is triggered to initiate application swapping by a system controller program 262 that executes on a general-purpose processor (GPP) 260 located outside of the MPS. For example, the system controller 262 may trigger application swapping in response to user input or any of various other kinds of triggers or conditions that originate outside the MPS. In some embodiments, the master task 55 may execute outside of the MPS. For example, FIG. 18 illustrates an embodiment in which the master task 55 executes on the external GPP 260 along with the system controller 262.

The system controller 262 may be written using a high-level application programming interface (API). The API may enable the system controller to be easily ported from one GPP to another by hiding the details of the underlying control and communication layer.

The master task 55 may receive high level commands from the system controller 262 (or from another application within the MPS), such as "swap application X out" or "swap application Y in," and in response may initiate and manage the requested application swapping.

The default behavior of the master task may be to start and stop applications as directed by the system controller 262. In some situations the master task 55 may communicate with a swappable application to manage its execution state. For example, the master task 55 may request a swappable application to come to a stable state so that it can be swapped out, or the master task 55 may be notified by the swappable application that it is in a stable state and is ready to be swapped out. This communication can be implemented through an API that the swappable application can call to communicate with the master task 55, or vice versa.

In various embodiments, as noted above, the MPS may have different form factors. In some embodiments the MPS may be implemented as an integrated circuit on a chip. In some embodiments multiple MPS chips may be used in the system. The chip(s) may be coupled to other hardware devices that are external to the chip(s), such as one or more off-chip processors (e.g., general-purpose processors) or one or more off-chip memory devices (e.g., RAM, flash memory, disk drives, or other types of memory or storage devices) or other hardware devices that are not part of the MPS itself. In some embodiments the off-chip memory may be used when swapping applications in or out, e.g., to save program data for an application being swapped out to a memory device external to the MPS, or to retrieve program instructions and/or data for an application being swapped in from the external memory device. The external memory device in which the information for the swapped-out application is stored may be the same external memory device from which the information for the swapped-in application is retrieved, or may be a different external memory device. The ability to swap the instructions and data for applications to and from external memory devices may be useful for MPSs that do not have sufficient internal memory resources to store in their entirety all of the applications that need to be executed on the MPS.

Figure 19:
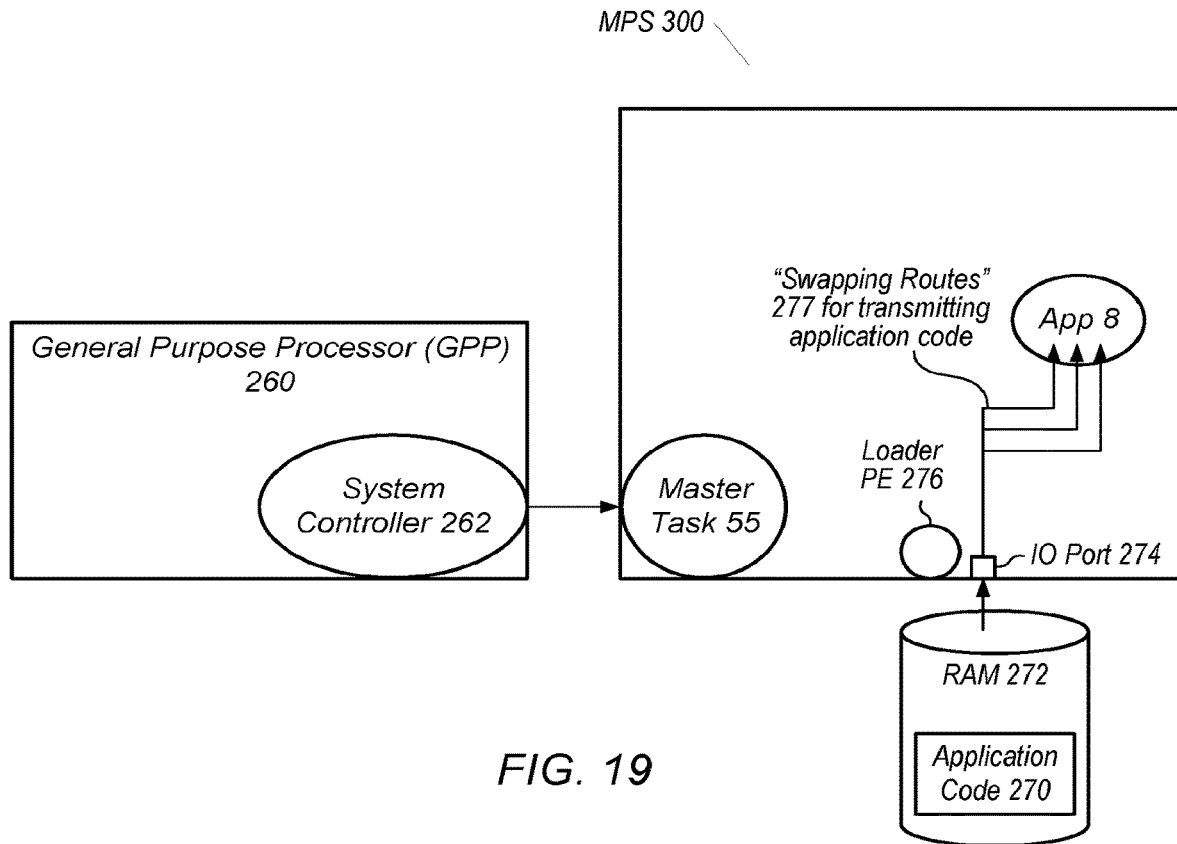
FIG. 19 illustrates resources involved in swapping in an application from an external memory device.

FIG. 19 illustrates resources involved in swapping in an application 8 from an external memory device 272, according to one embodiment. In this example, the application code 270 may initially be stored in a random-access memory (RAM) device 272 coupled to (and external to) the MPS 300. The RAM device 272 may include any kind of RAM, such as dynamic RAM (DRAM), synchronous dynamic RAM (SDRAM), Rambus DRAM (RDRAM), static RAM (SRAM), etc. The application code 270 may be loaded to the MPS from the RAM device 272 via an input/output (IO) port 274. The IO port 274 may be controlled by a dedicated loader PE 276. From the IO port 274, the application code may be transmitted via one or more swapping routes 277 to one or more of the internal memories of the MPS that are associated with the application 8.

In other embodiments, the application code 270 may be swapped in from any other kind of external memory device besides a RAM device. Examples of external memory devices that may be utilized for swapping include flash memory, magnetic or optical memory, disk drives, solid state drives, etc. As noted above however, in some embodiments one goal of the system may be to perform the swapping as quickly as possible. Thus, the type of external memory device that is used for the swapping may be chosen to be a fast type of memory device. For example, a DRAM device may generally enable the swapping to be performed faster than a flash memory device or disk drive, and thus may be preferred in some embodiments.

Figure 20:
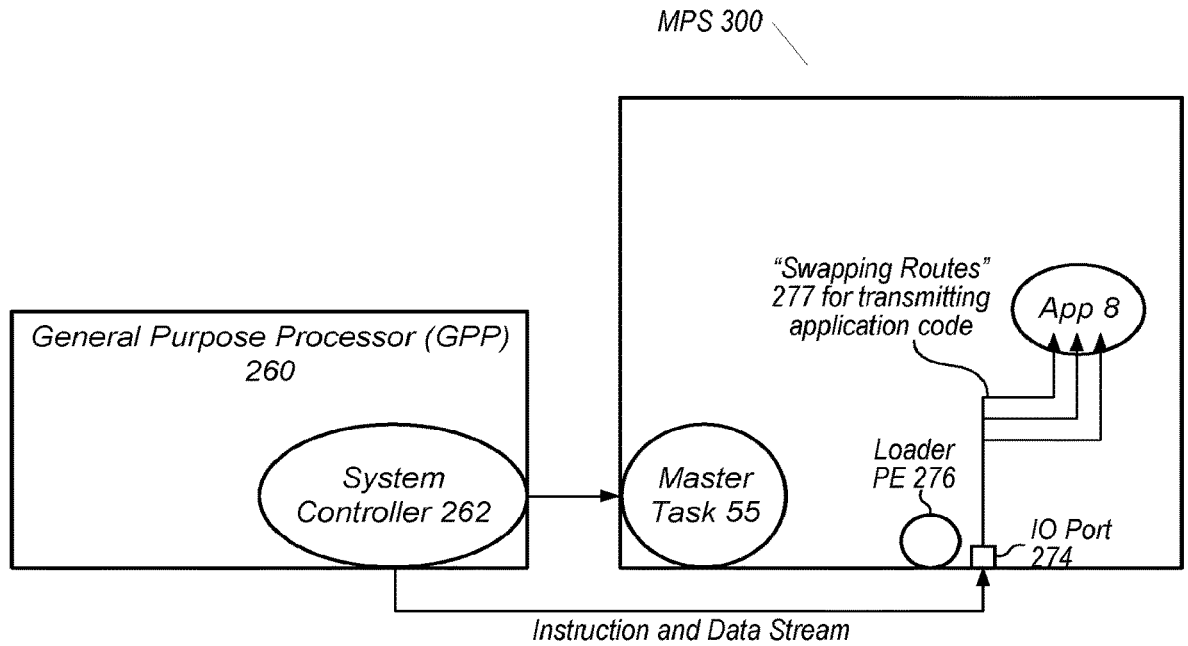
FIG. 20 illustrates an alternative embodiment in which application code is loaded into the MPS by sending an instruction and data stream from an external processor to the MPS.

FIG. 20 illustrates an alternative embodiment that may also enable fast swapping. In this example, the GPP 260 may load the application code 270 into the MPS by sending an instruction and data stream to the MPS. The system controller program 262 may control the instruction and data stream.

In some embodiments the system controller program 262 may run on the GPP 260 in an embedded operating system environment. In some embodiments the system controller 262 may be implemented using a subset of the Open Computing Language (OpenCL) language. The system controller 262 may communicate with the MPS through a chip-to-chip communication mechanism, but may be implemented to be independent of the communication mechanism.

The system controller 262 may send commands to the master task 55 either directly, such as through the MPS chip's serial bus (e.g., via a Debug Access Port (DAP)), or through a signal port. Since the amount of control data passing between the system controller 262 and the master task 55 will typically be small, communicating through the MPS's serial bus should not significantly affect the swapping performance. The system controller 262 can get data back from the MPS by reading data values using the DAP port. The system does not require a communication path from the MPS to the GPP but could employ one if it is available. The communication protocol between the GPP and the MPS can be implemented in many different ways depending on the capabilities of the GPP. For example, it can be a high-level protocol such as Universal Serial Bus (USB) or Peripheral Component Interconnect Express (PCIe), or it could be a simpler connection between a GPP bus and a signal port. In more complex protocols such as USB or PCIe, an FPGA device may be used between the GPP and MPS to implement the receive side of the protocol. In some embodiments, a small FPGA device may be used for the simpler GPP bus connection also.

For communication efficiency, in some embodiments the master task 55 may reside on a PE at a location that has direct access to the MPS's serial bus which is connected to all the other PEs and memories on the MPS. Using the serial bus for communication may be desirable in order to avoid interfering with ongoing data communication in the MPS that occurs in the interconnection network. However, any other means of communication between the master task and the rest of the swappable system can be used. In some embodiments a particular PE may be reserved for the master task 55 such that the PE cannot be used for applications. Also, in some embodiments a memory adjacent to the PE may be reserved for use by the master task 55 for its storage needs.

The instructions and data that define the swappable applications can be stored in any location that is accessible from the MPS. If the MPS includes sufficient internal memory resources, all the applications can be stored in local memory devices internal to the MPS. As mentioned above, in other embodiments the applications can be stored on one or more external memory devices, such as one or more DRAM devices coupled to the MPS, in the GPP file system and streamed directly to the system, in one or more flash memory devices coupled to the MPS, etc.

The important parameters of the application memory are the storage capacity and the bandwidth available for moving the instructions onto the MPS. For example, if one small application is being swapped, a local memory internal to the MPS could likely be used. For many systems the size of the internal memory may be limited and the speed of swapping is important, so streaming the application instructions directly from the GPP or using the attached DRAM may be necessary. Streaming the instructions directly from the GPP may be advantageous in hardware systems in which there are no DRAMs attached to the system or in systems where the DRAMs are supporting heavy data traffic for the applications already running on the system.

In cases where the application instructions are loaded from an external DRAM coupled to the MPS or streamed from the GPP, an I/O port 274 and an adjacent loader PE 276 that executes a loader task may be reserved for application swapping and cannot be used by applications, as shown in FIGS. 19 and 20. In some embodiments, the loader task may manage the application instructions and data flowing through the I/O port. For example, the instructions and data for swapping an application could be stored in a DRAM device connected to the IO port on the MPS, and the adjacent loader task can be used to pull the application instructions from the proper address in the DRAM and then send the instructions through the routing fabric to the internal MPS memories associated with the application's PEs.

When using a loader task for I/O port control, the master task may communicate with the loader task through a mechanism that will not disturb the running applications, e.g., through a serial bus of the MPS. The use of the serial bus may not interfere with the running applications since they may use a different routing fabric (e.g., the interconnection network) for their communication needs.

When swapping in an application, instructions and data for each of the application's tasks are moved into the appropriate memories on the MPS. In various embodiments, different mechanisms may be used for this transport, e.g., depending on the particular communication resources available on the MPS. In some embodiments, the instructions and data may be moved from their original storage locations to the appropriate on-chip memories through a high-speed routing fabric (also referred to herein as an interconnection network) implemented by the MPS. In other embodiments the instructions and data may be moved to the appropriate on-chip memories through a serial bus. Using the high-speed routing fabric may be significantly faster than using a serial bus.

When using the routing fabric, the swapping system may define a family of temporary "swapping routes" (one for each memory into which instructions and/or data are loaded) that is used for swapping. Using the communication routing fabric for moving the instructions and data may require ensuring that the swapping routes do not interact or collide with the communication routes being used by the other applications executing on the MPS. Consequently the swapping routes used to load the instructions may be planned carefully to not intersect with these other communication routes.

To help in this planning, each swapping route may be divided into two parts. The first part, referred to as the trunk route, is shared between all the swapping routes for the application. The trunk route connects from the instruction and data storage location to a location on the MPS in the general vicinity where the application will reside. The second part of the swapping routes, referred to as the ending routes, may connect the endpoint of the trunk route to the target memory devices used by the application. Thus, each swapping route may have a trunk part which is the same as all the other swapping routes for the application, and a unique ending route that goes from the endpoint of the trunk route to a particular memory device. In some embodiments, the user may also divide the memories used by the application into multiple sets, and a respective trunk route may be defined for each set. This may be useful for example if the application is very large and uses many different memory devices.

In some embodiments, the trunk route may be specified by user input, and the system software tools may then automatically define the second part of each swapping route. One advantage of using a trunk route is that the user can carefully define the route to avoid routes used by other running applications.

Some systems may have more than one routing layer for routing so that the trunk route can change layers as necessary to avoid other active routes. In some embodiments the system software tools may always use the first layer when generating the ending parts of the swapping routes so as to not interfere with any second-layer routes that reside in the swapping area of the MPS.

As noted above, moving instructions through the serial bus may be significantly slower than through the routing fabric. However, it may be desirable to use the serial bus to move instructions in situations where speed is not important and reducing the use of routing fabric resources is important. By definition, the master task may own the serial bus so that there cannot be any conflicts over access to it. In some embodiments, the serial bus could be used when the instructions are stored in an external flash memory device, or when instructions are streamed from the GPP into a port that is adjacent to the master task.

In some embodiments the MPS may include multiple chips, e.g., where each chip includes a plurality of processors and a plurality of memories interspersed among the processors. When application swapping is being used with multiple-chip systems, the dedicated application swapping resources described above may be duplicated on each chip, in some embodiments. Application instruction storage may be split into multiple DRAMs, or multiple streams of instruction may be employed as necessary. In addition, the system controller may be designed to understand the multi-chip system, e.g., in order to have knowledge of where the components reside in order to send commands to the proper chip.

In some embodiments, a swappable application may be distributed across multiple chips in the system, although it may simplify the swapping process to require that each swappable application run on only one chip.

Figure 21:
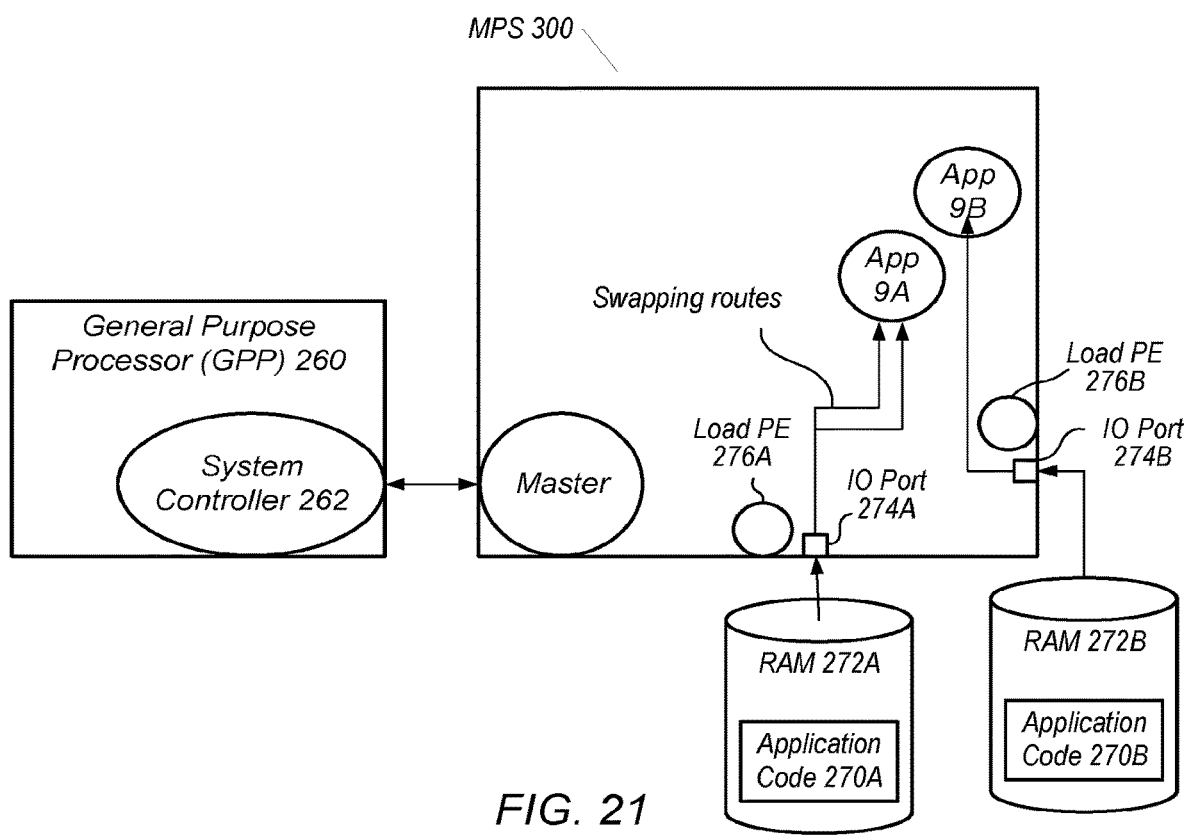
FIG. 21 illustrates an embodiment in which two applications are swapped in to an MPS simultaneously from two different external RAM devices.

In some embodiments, multiple applications can be swapped at the same time if there are multiple sources of independent data streams available to the system. For example, FIG. 21 illustrates an embodiment in which two applications 9A and 9B are swapped in simultaneously from two different RAM devices 272A and 272B. Two different loader tasks may execute on the load PEs 274A and 274B to simultaneously load the two applications via the IO ports 274A and 274B onto the MPS. Swapping in multiple applications simultaneously may enable the MPS to be reconfigured faster than if the applications were swapped in one at a time. The number of applications that can be swapped in or out simultaneously may depend on the number of external memory devices or sources of instruction streams the MPS is coupled to. For example, if the package for the chip has connections for four DRAMs, up to four applications could be swapped at the same time.

In some embodiments, the master task 55 may only run one thread at a time. The swapping procedures may be constructed such that the master task 55 can manage multiple swapping procedures running at the same time. For example, the most time-consuming part of swapping often will be moving the instructions from the DRAM or I/O port to the instruction memories of the application PEs. The master task 55 could simultaneously instruct the loader tasks next to the I/O ports to begin moving instructions. The other less time-consuming swapping steps could be done serially by the master task.

Multiple streams of instructions could also be used to swap in a single application in order to load the application faster. For example, instructions for an application being swapped in could be stored in two different external DRAM devices, and two different streams of instructions could initialize the application PEs in parallel, thereby halving the time to load the application.

Life Cycle of a Swappable Application

Figure 22:
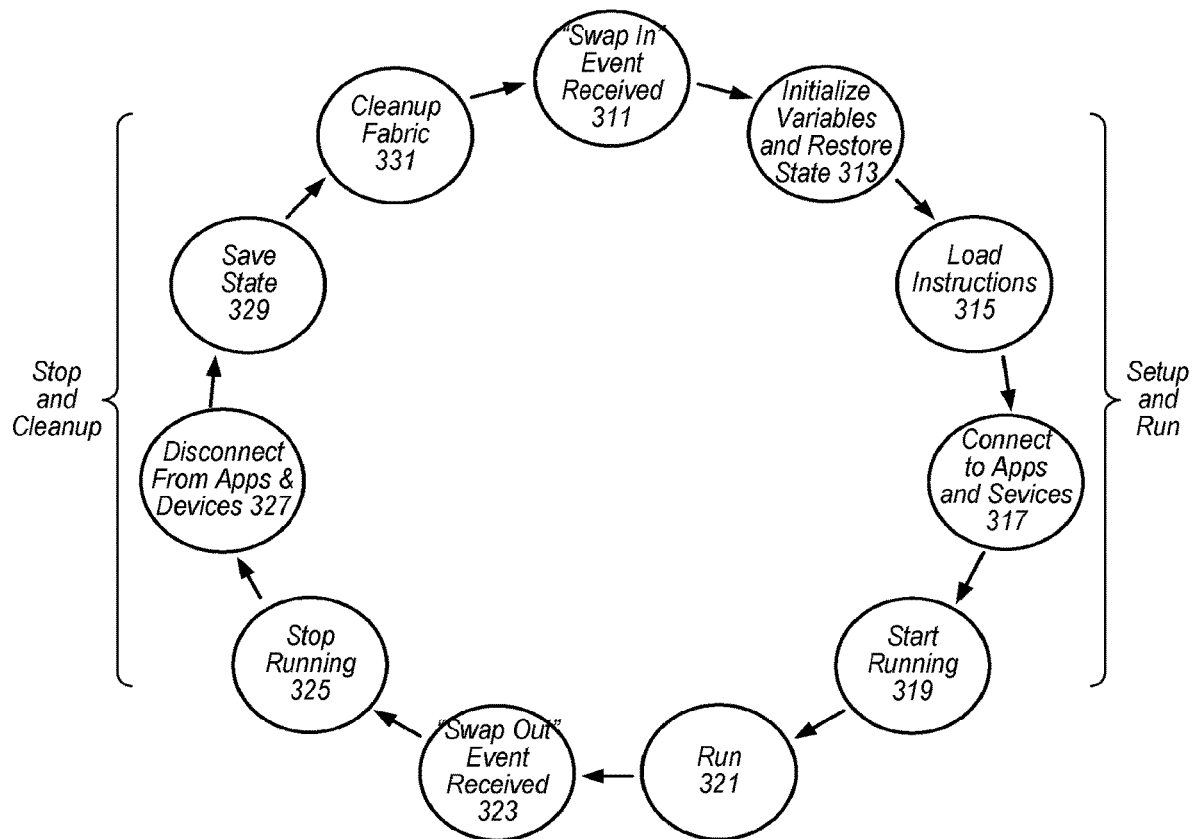
FIG. 22 illustrates a life cycle of swapping an application in and back out.

While the MPS is running, a given application may transition through a number of steps to first swap in, then execute, then stop executing, and then swap back out. The swappable application may go through this process many times. FIG. 22 illustrates the life cycle of swapping an application in and back out. The master task may be responsible for controlling the sequence of steps. Some steps may be done in a slightly different order in a given circumstance, or not be done at all.

In some cases, there could be a one-time initialization step to execute system-level functions that is done when the system is reset. For example, an I/O port that is used by many different swappable applications could be initialized, or application data initializations could be written to external DRAMs. Starting from a system that has been reset, a "Swap in Application" event may be received by the master task, as shown in 311. This event may be received internally from the MPS, e.g., from another application, or may be received as an external signal, e.g., from the system controller executing on the GPP externally from the MPS.

The master task 55 may then cause the variables for the application being swapped in to be initialized and/or cause the previous state of the application (if it was previously saved) to be restored, as shown in 313. The variable initializations (if any) may be derived from the program code for the application, e.g., from C program code in some embodiments. If any of the variable states for the application's variables were previously saved (e.g., from a previous execution of the application) then the variable states may be loaded. This may restore the application to its saved state. The saved variable states may override the initializations derived from the application's program code. The initialization and state restoration of the application variables may be done by storing information specifying the variable values in one or more of the memories used by the application.

As shown in 315, the master task 55 may also cause the program instructions of the application to be loaded into the corresponding internal MPS memories associated with the application (if they are not already loaded), e.g., by loading them from one or more external DRAM devices or other external sources. After the instructions have been loaded, the application PEs assigned to execute the instructions may be put into a wait state.

As shown in 317, the master task 55 may also handle the coupling of the application's communications to one or more of the other applications that are loaded in the MPS, e.g., may enable the application to begin communicating with each of the other applications that it needs to communicate with in order to perform the application's intended function. The master task 55 may also initialize devices or resources that are used by the application, such as I/O ports, DRAM ports, etc. and/or perform any operations necessary to cause the application to connect to these devices and resources. The master task 55 may also initialize the DRAM devices, DRAM contents, and devices connected to I/O ports used by the application (if needed).

The master task 55 may then start the application, as shown in 319. For example, the master task 55 may send a wakeup signal to each of the application's PEs to cause them to begin executing their respective program instructions from their associated memory devices. Once started, the application may continue running (block 321) until the master task 55 receives a "Swap out application" event (block 323). In some embodiments the application itself may send the master task 55 a signal indicating that it has finished executing and can thus be swapped out. In other embodiments the master task 55 may receive the swap out event from another application executing on the MPS, or from the system controller 262 or other external source.

In response, the master task 55 may stop the application from executing, as shown in 325. For example, the master task 55 may send a stop signal to each of the application's PEs to cause them to stop executing. In some embodiments the signal may also cause the PEs to reset to a known state.

As shown in 327, the master task 55 may cause the application to be disconnected from the other applications and devices that it was previously connected to when it was loaded. This may include terminating the communication pathways between the application and any other applications it was coupled to. The master task 55 may also perform any operations necessary to shut down or reset the peripheral devices or other resources in use by the application.

As shown in 329, the master task 55 may also manage the process of saving the application's state. For example, the values of all the application's variables, or the values of a selected subset of the application's variables whose state needs to be saved, may be transmitted from one or more of the internal MPS memories to one or more external RAM devices or other external memory devices for external storage until needed again. The contents of registers that correspond to the application's variables may also be saved.

As shown in 331, the master task 55 may also perform one or more operations to cleanup the internal resources of the MPS. For example, this may include resetting all the internal memories used by the application. At the conclusion of this process the PEs, memories, and routing segments that had been used by this application will be ready to be used for some other purpose.

Figure 23:
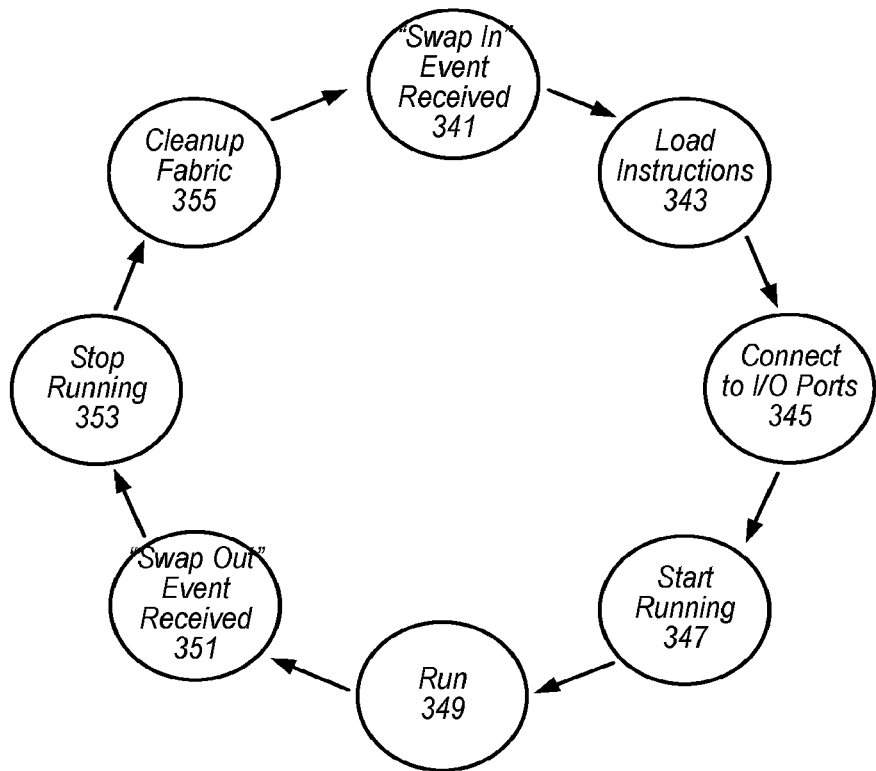
FIG. 23 illustrates a life cycle of swapping a simple application in and back out.

It is noted that not all of these steps may need to be performed, e.g., depending on the particular application. For example, FIG. 23 illustrates a simplified life cycle for an application that only need to connect to I/O ports, and does not need to communicate with other applications or save its state between executions.

Executable Components Created to Implement Swapping

Figure 24:
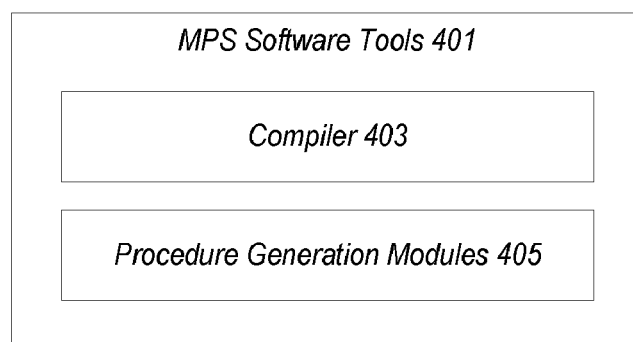
FIG. 24 illustrates a set of software tools for generating the executable software code needed to implement application swapping.

As illustrated in FIG. 24, a set of software tools 401 may be provided for the MPS to generate the software code needed to implement the application swapping techniques described herein. The tools 401 may include a compiler 403 configured to compile the source code of the applications into executable program instructions, as well as one or more procedure generation modules 405. The procedure generation modules 405 may be configured to automatically generate executable software procedures that will be executed at runtime to implement the swapping process. For example, the procedures may execute to perform operations involved in the application swapping, such as loading the application's saved state, initializing devices used by the application, etc. These procedures may only be created as needed. For example, a particular application may not save or restore its state, so the corresponding procedures for these operations may not be created in this case. Some of the created procedures may be executed by application tasks, some by the loader task (if it exists), and some by the master task. The task that executes each procedure may be determined based on the proximity to the resources being accessed and the configuration of the MPS. In some embodiments, the overall sequencing of these procedures is managed by the master task.

According to some embodiments, procedures to perform the following operations may be automatically generated by the procedure generation modules 405 prior to runtime, and then executed at runtime by the loader task: initialize variable values derived from the application's underlying program code; load the application's executable program instructions; and load the application's saved state.

According to some embodiments, procedures to perform the following operations may be automatically generated by the procedure generation modules 405 prior to runtime, and then executed at runtime by the application tasks: initialize I/O and DRAM ports; initialize the DRAM controller and peripheral I/O devices (these DRAMs and I/Os are used by the application and not used for swapping); and shut down the peripheral I/O devices.

According to some embodiments, procedures to perform the following operations may be automatically generated by the procedure generation modules 405 prior to runtime, and then executed at runtime by the master task: couple application to neighboring applications; start the application (take PEs out of wait state); stop the application; decouple the application from neighboring applications; save the application state to the DRAM; and cleanup the internal MPS memories and routing fabric.

Layout and Development of Swappable Applications

In some embodiments, the applications that execute on the MPS may be classified into two sets. One set of applications is referred to as the base system. The base system includes one or more non-swappable applications, e.g., applications that remain loaded and executing while the MPS is running. The other set is the set of swappable applications that can be dynamically swapped in and out. Any time the MPS is running, the combination of swappable and non-swappable applications that are resident on the MPS are able to operate without interfering with each other. Such a set of mutually non-interfering applications is called a legal configuration. A swappable application with a given layout and location on the MPS is called an application instance. Different layouts or locations of the same swappable application are different application instances because the same swapping code cannot be used for both. For example, one instance of the application may be deployed on one region of the MPS and use one subset of the MPS's memories and PEs, and another instance of the application may be deployed on another region of the MPS and use a different subset of the MPS's memories and PEs. The swappable code may need to be specific to each instance, e.g., in order to load the application's instructions into the correct memories, communicate with the correct PEs to start them running, etc.

Figure 25:
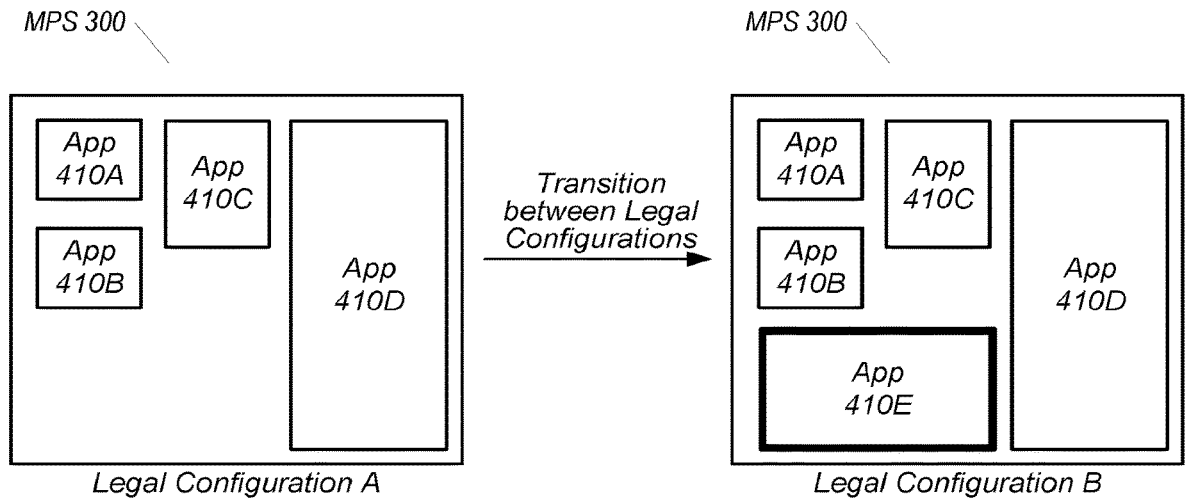
FIG. 25 illustrates a transition from one application configuration on an MPS to another application configuration on the MPS.

A swappable MPS system can be seen as a system that transitions from one legal configuration to another legal configuration as swapping events occur. Swapping procedures cause transitions from one legal configuration to another. Such swapping procedures can include swapping in one or more applications and swapping out one or more other applications, adding or swapping in one or more applications to the MPS (e.g., without swapping out another application), and removing or swapping out one or more applications from the MPS (e.g., without swapping in another application). FIG. 25 illustrates an example of an MPS 300 where four applications 410A-410D are deployed on four respective regions of the MPS, as shown by the legal configuration A on the left side. At some point while the MPS is running, a fifth application 410E may be dynamically added, resulting in a transition to the new legal configuration B shown on the right side.

Figure 26:
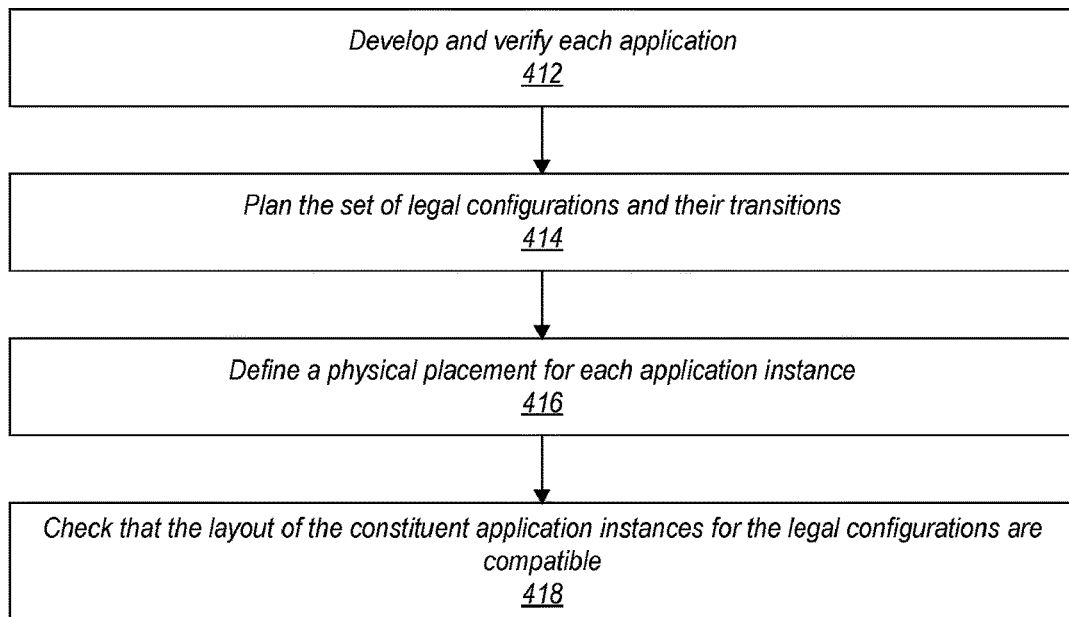
FIG. 26 illustrates a development workflow that may be used during the development phase of the system to construct sets of applications that are mutually non-interfering.

Each swapping procedure should be implemented so as to not interfere with the base system or other swappable applications not involved in the swapping procedure. FIG. 26 illustrates a development workflow that may be used during the development phase of the system to construct sets of applications that are mutually non-interfering (legal configurations).

Each application may be developed and verified (block 412). Developing and verifying an application may include creating the application code, packaging the application in the form of an application cell, constructing a test bench for the application which instantiates the application cell and gives it placement and routing, and verifying the application cell using the test bench.

The set of applications that comprise each legal configuration may be defined. The set of legal configurations and their transitions may be planned (block 414).

A physical placement for each application instance may be defined (block 416). All other application instances that border on the application's perimeter (in any legal configuration) may be identified. The placement and routing for the application may be defined so as to avoid the bordering applications. In some embodiments, adjacent applications may not share any of the MPS's internal memories because memory conflicts in a shared memory could cause timing issues for the applications. Also, the internal memories used by an application may be reset when the application is swapped.

Figure 27:
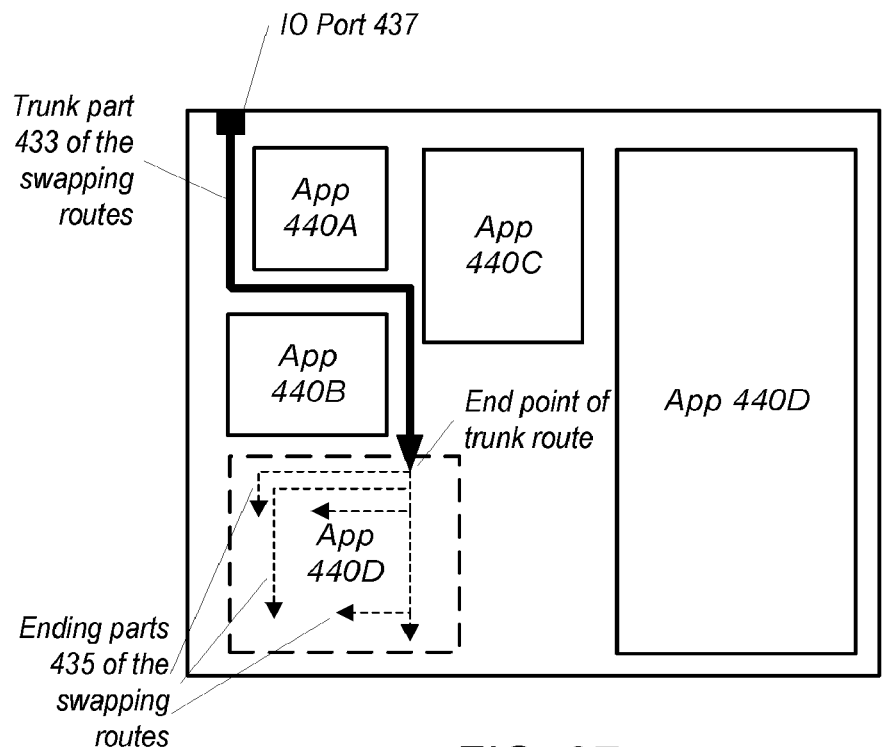
FIG. 27 illustrates an example in which a plurality of swapping routes are being used to swap in an application.

As discussed above, if the internal memory in the MPS is limited so that it cannot store the instructions for multiple applications, then instructions will be moved into the MPS from outside the MPS via swapping routes. The application's swapping should be defined so as to not interfere with the border applications. Defining the swapping routes may include defining a trunk route from the instruction source to the general vicinity of the application instance such that the trunk route does not interfere with the border applications. Each of the swapping routes for the application may use the trunk route as the first part of the swapping route. The swapping routes may then branch off from the end of the trunk route to the respective internal memories used by the application. The trunk route may be defined so as to not interfere with other border applications in every legal configuration in which the application instance is resident. FIG. 27 illustrates an example in which a plurality of swapping routes is being used to swap in an application 440D. The beginning part of each swapping route is the trunk part 433 (indicated by the bold line) which originates from the I/O port 437. The ending parts 435 (indicated by the dashed lines) of the swapping routes branch off from the ending point of the trunk route and continue on to individual memories located in the region of the MPS on which the application 440D is deployed. In various embodiments, any number of swapping routes may be used to load the program instructions for an application, e.g., depending on how many PEs and memories are used by the application.

Referring again to FIG. 26, the development workflow may also include checking the layout of the constituent application instances for the legal configurations to ensure that the respective application layouts are compatible with each other. To check a given legal configuration, a top level test bench which instantiates all the application cells for the configuration may be created. Placement and routing for each application cell and for the connections between application cells and I/Os may be provided. The placement and routing of the combined set of application cells may be checked to ensure that there are no conflicts over physical resources. In some embodiments the behavior of the entire configuration may be verified by simulating the configuration and the test bench.

Communication Between Swappable Applications

As described above, swapping an application in or out may include coupling or uncoupling communication between the application and one or more other applications executing on the MPS (or between the application and one or more physical ports or peripheral devices). The communication may occur through the routing fabric of the MPS. When swapping out an application, the termination of the application's communications may need to be handled carefully so that the routing fabric is not left in an unusable state. For example, in some embodiments, if a swappable application is crudely terminated while sending a block of data to another application, the existing routing may not be able to be easily reused again until the system is reset.

Figure 28:
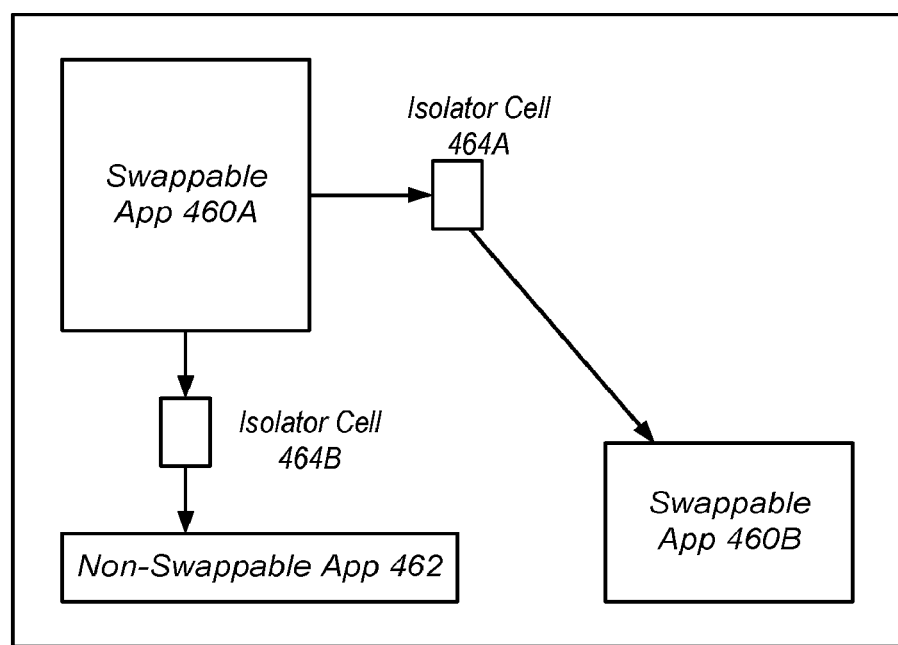
FIG. 28 illustrates an example in which a swappable application communicates with other applications by passing data via isolators.

In some embodiments, the applications executing on the MPS may communicate by passing data to each other through buffer memory devices. In some embodiments, each buffer memory device may be included in a special type of application cell referred to herein as an "isolator cell." In some embodiments, an isolator cell may have one input and one output. The isolator cell may buffer the incoming data and then copy it to the output. The use of an isolator cell may provide a way for the master task to break and restore connections between active applications in a reliable and consistent way. The MPS may contain many isolator cells. FIG. 28 illustrates an example in which a swappable application 460A communicates with another swappable application 460B by passing data to the swappable application 460B via an isolator cell 464A. The swappable application 460A also communicates with a non-swappable application 462 by passing data via another isolator cell 464B.

An isolator cell may be designed such that the master task can send commands through the serial bus to the isolator cell to cause the isolator cell to break the connection between two connected applications in preparation for swapping one of the applications out. After the application has been swapped out and a new one swapped in, the new application can be connected to the isolator to restore the flow of data in the system.

Different modes of operation are possible when the isolator cell breaks a connection between the applications. According to some embodiments, when the application on the downstream (receive) side of the isolator cell is being swapped out, the default behavior of the isolator cell is to stop accepting data from the sending application once the connection has been broken. Any incoming data may back up in the routing fabric and eventually cause the sending application to stall. In an alternate mode, the isolator cell may continue to accept new data packets and simply overwrite the data packet in the isolator cell's memory buffer.

According to some embodiments, when the application on the upstream (send) side of the isolator cell is being swapped out, the default behavior of the isolator cell is to stop forwarding data to the receiving application once there is no more incoming data. In an alternate mode, the isolator cell may continue to send data to the receiving application by continually sending the existing data in the isolator cell's memory buffer over and over again. For example, it may sometimes be desirable to keep the data flowing so that the downstream application will not go into a bad state or lock up.

It may simplify the swapping method if an isolator cell always exists while any application is running on the MPS. It may be simplest if each isolator cell exists in every legal configuration at exactly the same location. Using a fixed location may allow the swappable applications that use the isolator cell to have a reliable physical location to connect to, and may provide a reliable location for the master task to communicate with the isolator cell.

In more complex implementations, the isolator cell can be allowed to not exist in every legal configuration. For example, the isolator can be removed (or moved) if both its upstream and downstream applications are being swapped out and if the new application(s) that are being swapped in do not use that isolator cell or use it in a different location.

In some situations it may be problematic to abruptly stop the flow of data between applications. For example, the data being transferred may comprise data elements that have a certain structure. If the communication between the applications is cut off in the middle of transmitting a given data element then the receiving application may receive only part of the data element and may not know how to handle the partial data element. To overcome this problem, in some embodiments the isolator cell between the applications may have built-in knowledge of the data elements and may ensure that the communication is not cut off in the middle of transmitting a data element.

For example, consider a situation where a swappable application is transmitting video data to another application. Each frame of video data may have a structure that starts with a header. The header may specify the size of the frame. The header may be followed by a series of lines and line terminations, followed by a footer or tail. All the video frames may be expected to have the same frame structure. Thus, the receiving application may not be able to handle a partial frame. The isolator cell may be enhanced to possess knowledge of the video frame structure so that it understands the data it is passing from the sending application to the receiving application. When the isolator cell receives a command to isolate the two applications while a transfer of a frame is in progress, it may not immediately terminate the transfer of the frame, but may instead continue the transfer until the rest of the frame has been transmitted. This may prevent the receiving application from receiving only a partial frame.

When a new application is swapped in, the new application may be coupled to the application(s) with which it communicates by configuring one or more of the isolator cells in the MPS. For example, if the new application communicates with the same other application(s) as an old application that was swapped out then the new application may be coupled to these other application(s) by controlling the same one or more isolator cells involved in decoupling the old application from the other application(s).

For example, the old application may have been on the downstream side from a given isolator cell, and the isolator cell may have been discontinued from accepting data from a sending application when the old application was swapped out. When the new application is swapped in, the isolator cell may be placed back in a mode of accepting data. Thus, when the execution of the new application is started, the data sent by the sending application may now be sent to the new application instead of the old application which previously received data from the sending application.

As another example, the old application may have been on the upstream side from a given isolator cell, and the isolator cell may have been discontinued from forwarding data to a receiving application when the old application was swapped out. When the new application is swapped in, the isolator cell may be placed back in a mode of forwarding data. Thus, when the execution of the new application is started, the receiving application may now receive data from the new application instead of the old application that previously sent data to the receiving application.

It is noted that the new application may also communicate with a different set of one or more applications than the old application communicated with. Thus, in some embodiments a different set of isolator cells may be configured to couple the new application to its respective communicant applications than were used for the communications of the old application.

Reliable Communication without Isolator Cells

Isolator cells may be especially useful in systems where the timing of when the applications swap in and out is not reliably known. Employing isolator cells may allow breaking and killing a communication to be performed reliably and keep the system in a known good state.

However, other embodiments that do not use isolator cells are also contemplated. For example, in some embodiments an application may be designed to reliably clean up its external communications. The cleanup may be done in concert with the partner upstream or downstream application. Applications can begin cleaning up their communications in at least two situations, e.g., when the application has completed its computation, and when the application has been commanded to transition to a stable state and clean itself up.

In some embodiments, when the master task sends a command to the application, the communication mechanism between the application and the master task can be a simple polling style API that uses one or more mailbox registers in each PE. This may be advantageous because it does not require all the PEs to have a means to directly communicate back to the master task. As an example, the API may have the following two functions which can be called by swappable applications:

MPX_ready_to_swap( . . . )—The application has come to a stable state after cleaning up its external communication(s) and notifies the master task that it is ready to swap; and MPX_check_for_stop_request( . . . )—The application checks if the master task has asked it to stop computing and come to a stable state.

A typical way this API could be used is that the master task may request the application to stop by sending a value to a mailbox register. The application may receive the stop request by polling, e.g., by calling the MPX_check_for_stop_request( . . . ) function at various times during its execution. In response to the stop request, the application may stop and clean up its external communications. The application may then notify the master task that it is ready to swap out by calling the MPX_ready_to_swap( . . . ) function, which sets a value in a mailbox register. The master task may receive this notification by polling the mailbox register.

The API could also be used if the application has independently finished its calculation. For example, the application may stop and clean up its external communications. The application may then notify the master task that it is ready to swap by calling the MPX_ready_to_swap( . . . ) function. The master task may receive the notification by polling the mailbox register.

The System Controller

In some embodiments the system controller program may provide the system-level control of application swapping. The system controller may run on a processor that is external to the MPS. In an exemplary implementation, the system controller runs on an external general-purpose processor and communicates commands to the master task which then carries out those commands.

In some embodiments the system controller may be an application, which runs on the GPP and utilizes a subset of the Open Computing Language (OpenCL) host control API. The API subset provides functions for modeling the attached hardware system, starting and stopping applications, and moving data to and from embedded memory (for example, the DRAMs attached to the system).

The implementation of the OpenCL subset may be designed to be portable across different GPPs so that a system controller program written for an ARM processor could be ported to an x86 processor by simply recompiling. To do this the APIs should be implemented in two layers: the generic API layer, and the data communication layer. The data communication layer may be specific to a particular hardware platform and would be ported to any new hardware platform. One OpenCL capability is the support for executing native programs on attached compute engines.

Realizing a Swappable System

Once the logical and physical design and verification of the swappable system have been done, the object and information files necessary to execute the design on the target system may be created. In some embodiments, this may be done as follows: 1) Create and verify the base system. 2) Create and verify all swappable applications. 3) Create and verify all legal configurations. 4) Create the database and object file for the base system including the isolator cells. 5) Create executable swapping procedures for each unique application instance in each legal configuration. This may be repeated for each legal configuration until swappable object files have been created for all application instances. 6) Generate a master database for the entire set of applications. This may allow the system controller and master task to manage the set of applications during run time. 7) Compile the system controller program on the GPP.

Runtime Initialization

Running the swappable system may begin with the system controller. The system controller may first load the master task and the loader tasks (if needed). The master task may then complete the following: 1) Run pre-boot initialization to initialize all resources such as DDR controllers and IO controllers. 2) Transfer object files for swappable applications to DRAM(s) if required. 3) Load the base system including all non-swappable applications and the isolator cells. 4) Wait for instructions from the system controller. During runtime, the system controller can control the state of the running system by sending commands to the master task.

Verifying a System Containing Swappable Applications

Individual applications may be independently verified in the usual way by ensuring that they respond to stimuli correctly. Applications that communicate with each other should be verified together, e.g., using the development workflow described above. Verification of all legal configurations should be done using normal software or hardware techniques for verifying a complete system.

Verification of the swapping procedure of a single application can also be done with a software simulator. This may be accomplished by defining a swappable system that solely consists of the single application and its associated test benches (as non-swappable applications). Then the entire swapping process including the master task and loader task can be executed and observed in the simulation environment. For verification of the application swapping mechanism, the system controller running on the GPP does not need to be simulated. The commands from the system controller may be emulated via a data file, which is streamed into the I/O port (or DAP port) during simulation or by creating an external program that can statically or interactively emulate the temporal behavior of the system controller.

Debugging a System Containing Swappable Applications

A number of different debugging tasks can be performed for a complex multi-application swappable system. They may include:

1. Individual applications can be independently debugged as normal during the application creation and verification process.

2. The swapping procedure for an individual application can be debugged using the procedure described above. Then the entire swapping process can be executed and debugged in the simulation (or hardware debugging) environment including all the code in the master task and in the loader task.

3. Debugging individual configurations can proceed by defining a top level configuration test bench for all the active applications and using debugging commands as needed. Since a stable configuration is being debugged, the simulator does not need to execute any application swapping steps and can run just the applications.

4. For debugging the complete swappable system, the debugger can load the complete project including the base system, isolator cells, and the application instances. At all times during the debugging session, the simulator (or execution of the system on hardware) can keep track of which application instances are swapped in, or are in the process of swapping in or out. This information can be displayed to the user so that the running applications are debuggable and the non-running applications are visible but not debuggable. This information can also be used to gather and display system statistics and to display the system-level swapping behavior.

When debugging a system of swappable applications, the debugger may have two options for the behavior of debugging commands (for example, breakpoints and single stepping). The first option may treat the entire design as a single system, and debugging commands can be applied to all active applications in the design (for example, a breakpoint stops all applications). The second option may allow each application to be debugged independently. In this case, a breakpoint stops just the application it resides in. In addition, the debugger will provide the ability to set breakpoints in applications that are currently swapped out. That way, when it is swapped in, the breakpoint is active immediately.

For debugging the system controller on the GPP together with the MPS, the debugger can provide an Eclipse-based development environment that runs concurrently with the system development environment. The two development environments may be linked so that they share debugging events. For example, a breakpoint in the GPP could be defined to also break the applications running on the MPS. Alternately, if the user does not want to debug the actual system controller, the debugger could provide a GPP emulator which can interactively or programmatically provide a system controller command stream to the running system.

In various embodiments a computer-readable memory medium may store program instructions executable by the processors of the MPS and/or one or more external processors to implement various functions described above, such as functions involved in swapping software applications. Generally, the computer-readable memory medium may include any set of instructions which, when executed, implement a portion or all of the functions described herein. Generally speaking, a computer-readable memory medium may include any storage media accessible by a computer during use to provide instructions and/or data to a computer system. For example, a computer-readable memory medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An apparatus, comprising:
a first subset of a plurality of processors configured to execute a master task;
a second subset of the plurality of processors configured to execute a plurality of applications;
a plurality of memory circuits interspersed among the processors; and
a communication fabric interconnecting the plurality of processors and the plurality of memory circuits, wherein the communication fabric includes a plurality of buffer circuits interspersed among at least a subset of the plurality of processors, wherein the plurality of buffer circuits are configured to communicate data between the plurality of applications executing on the second subset of the plurality of processors via a first set of routes between a first subset of the plurality of buffer circuits;
wherein the first subset of the plurality of processors are configured, in response to executing the master task, to:
initiate storing one or more variable states associated with a first application of the plurality of applications;
initiate swapping the first application with a second application not included in the plurality of applications;
distribute instructions associated with the second application to different ones of the plurality of memory circuits via a second set of routes between a second subset of the plurality of buffer circuits;
execute the second application on the second subset of the plurality of processors; and
initiate restoring the first application by swapping the first application with a third application of the plurality of applications using the one or more variable states.

2. The apparatus of claim 1, wherein to initiate the storing of the one or more variable states, the first subset of the plurality of processors are further configured to initiate transmitting the one or more variable states from one or more memory circuits of the plurality of memory circuits to a particular memory circuit external to a multi-processor system that includes the plurality of processors, the plurality of memory circuits, and the communication fabric.

3. The apparatus of claim 2, wherein to initiate restoring the first application, the first subset of the plurality of processors are further configured to:
- initiate retrieving the one or more variable states from the particular memory circuit;
- initiate storing the one or more variable states in a subset of the plurality of memory circuits that will be used by the first application; and
- initiate executing the first application, along with the second application, and the plurality of applications excluding the third application.

4. The apparatus of claim 1, wherein to initiate swapping the first application, the first subset of the plurality of processors is further configured to initiate stopping the first application by halting a subset of the plurality of processors executing the first application.

5. The apparatus of claim 4, wherein the first subset of the plurality of processors is further configured, in response to a determination that the subset of the plurality of processors have halted, to initiate performing one or more cleanup operations on resources associated with the first application.

6. The apparatus of claim 5, wherein to initiate performing the one or more cleanup operations, the first subset of the plurality of processors is further configured to:
- initiate resetting a subset of the plurality of memory circuits associated with the first application; and
- initiate resetting one or more routes between the plurality of processors used by the first application.

7. A method, comprising:
- loading a plurality of applications on a multi-processor system that includes a plurality of processors and a plurality of data memory routers interspersed among the plurality of processors, wherein the plurality of applications includes a first application;
- executing the plurality of applications on the multi-processor system, wherein the plurality of applications execute together and communicate via a first set of routes established between a first subset of the plurality of data memory routers;
- swapping the first application, while continuing executing remaining ones of the plurality of applications excluding the first application, with a second application not included in the plurality of applications;
- wherein swapping the first application includes saving one or more variable states associated with the first application;
- distributing instructions associated with the second application among different ones of the plurality of data memory routers via a second set of routes established between a second subset of the plurality of data memory routers;
- executing the second application along with remaining ones of the plurality of applications; and
- restoring the first application by swapping the first application with a third application of the plurality of applications using the one or more variable states.

8. The method of claim 7, wherein saving the one or more variable states includes transmitting the one or more variable states from one or more memory circuits of the plurality of data memory routers to a particular memory circuit external to the multi-processor system.

9. The method of claim 8, wherein restoring the first application includes:
- retrieving the one or more variable states from the particular memory circuit;
- storing the one or more variable states in a particular subset of the plurality of data memory routers that will be used by the first application; and
- executing the first application, along with the second application, and the plurality of applications excluding the third application.

10. The method of claim 7, wherein swapping the first application further includes stopping the first application by halting a subset of the plurality of processors executing the first application.

11. The method of claim 10, further comprising, in response to determining the subset of the plurality of processors have halted, performing one or more cleanup operations on resources associated with the first application.

12. The method of claim 11, wherein performing the one or more cleanup operations includes:
- resetting a particular subset of the plurality of data memory routers associated with the first application; and
- resetting one or more routes between the plurality of processors used by the first application.

13. The method of claim 7, wherein swapping the first application further includes terminating communication between the first application and one or more of the plurality of applications.

14. A non-transitory computer-readable memory medium storing program instructions, wherein the program instructions are executable by a multi-processor system to perform operations including:
- loading a plurality of applications on the multi-processor system that includes a plurality of processors and a plurality of data memory routers interspersed among the plurality of processors, wherein the plurality of applications includes a first application;
- executing the plurality of applications on the multi-processor system, wherein the plurality of applications execute together and communicate via a first set of routes established between a first subset of the plurality of data memory routers;
- swapping the first application, while continuing executing remaining ones of the plurality of applications excluding the first application, with a second application not included in the plurality of applications;
- wherein swapping the first application includes saving one or more variable states associated with the first application;
- distributing instructions associated with the second application among different ones of the plurality of data memory routers via a second set of routes established between a second subset of the plurality of data memory routers;
- executing the second application along with remaining ones of the plurality of applications; and
- restoring the first application by swapping the first application with a third application of the plurality of applications using the one or more variable states.

15. The non-transitory computer-readable memory medium of claim 14, wherein saving the one or more variable states includes transmitting the one or more variable states from one or more data memory routers of the plurality of data memory routers to a particular memory circuit external to the multi-processor system.

16. The non-transitory computer-readable memory medium of claim 15, wherein restoring the first application includes:
- retrieving the one or more variable states from the particular memory circuit;

storing the one or more variable states in a subset of the plurality of data memory routers that will be used by the first application; and executing the first application, along with the second application, and the plurality of applications excluding the third application.

17. The non-transitory computer-readable memory medium of claim 14, wherein swapping the first application further includes stopping the first application by halting a subset of the plurality of processors executing the first application.

18. The non-transitory computer-readable memory medium of claim 17, wherein the operations further include, in response to determining the subset of the plurality of processors have halted, performing one or more cleanup operations on resources associated with the first application.

19. The non-transitory computer-readable memory medium of claim 18, wherein performing the one or more cleanup operations includes:

resetting a particular subset of the plurality of data memory routers associated with the first application; and resetting one or more routes between the plurality of processors used by the first application.

20. The non-transitory computer-readable memory medium of claim 14, wherein swapping the first application further includes terminating communication between the first application and one or more of the plurality of applications.

\* \* \* \* \*